US010797919B2

(12) United States Patent
Nguyen et al.

(10) Patent No.: US 10,797,919 B2
(45) Date of Patent: Oct. 6, 2020

(54) SYSTEM AND METHODS FOR REALISING ADAPTIVE RADIO ACCESS TECHNOLOGY IN 5G WIRELESS COMMUNICATION SYSTEM

(71) Applicant: NEC CORPORATION, Tokyo (JP)

(72) Inventors: Phong Nguyen, Victoria (AU); Takahiro Sasaki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/327,612

(22) PCT Filed: Feb. 27, 2017

(86) PCT No.: PCT/JP2017/009110
§ 371 (c)(1),
(2) Date: Feb. 22, 2019

(87) PCT Pub. No.: WO2018/037599
PCT Pub. Date: Mar. 1, 2018

(65) Prior Publication Data
US 2019/0190751 A1 Jun. 20, 2019

(30) Foreign Application Priority Data

Aug. 24, 2016 (AU) .............................. 2016-903365

(51) Int. Cl.
*H04L 27/06* (2006.01)
*H04L 27/00* (2006.01)
(Continued)

(52) U.S. Cl.
CPC .......... *H04L 27/0008* (2013.01); *H04L 5/001* (2013.01); *H04L 5/0048* (2013.01);
(Continued)

(58) Field of Classification Search
CPC . H04L 27/0008; H04L 27/2657; H04L 5/001; H04L 5/0048; H04L 5/0087; H04L 5/0091; H04L 27/2655
See application file for complete search history.

(56) References Cited

U.S. PATENT DOCUMENTS 9,137,074 B2 * 9/2015 Vilaipornsawai ... H04L 27/2607
2020/0077354 A1 * 3/2020 Onggosanusi ........ H04L 5/0094

FOREIGN PATENT DOCUMENTS

| JP | 2007-221743 A | 8/2007 |
|---|---|---|
| WO | 2016/004634 A1 | 1/2016 |
| WO | 2016/130175 A1 | 8/2016 |

OTHER PUBLICATIONS

"Forward compatibility for numerology and frame structure design", ZTE, ZTE Microelectronics, 3GPP TSG-RAN WG1 Meeting #85, R1-164261, May 23-27, 2016, 7 pages, Nanjing, China.
(Continued)

*Primary Examiner* — Lan-Huong Truong
(74) *Attorney, Agent, or Firm* — Sughrue Mion, PLLC

(57) ABSTRACT

An advanced wireless communication system and method for use therein provides adaptive radio access using a plurality of configurable OFDM-based waveforms. The method comprises: receiving, at a UE and on a band-specific fixed system subband, one or more synchronisation signals; determining, at the UE, and according to the synchronisation signals, a base waveform numerology; and receiving, at the UE and according to the base waveform numerology, system information, wherein the system information defines parameters for a service or services.

20 Claims, 18 Drawing Sheets

(51) Int. Cl.
*H04L 5/00* (2006.01)
*H04L 27/26* (2006.01)

(52) U.S. Cl.
CPC .......... *H04L 5/0087* (2013.01); *H04L 5/0091* (2013.01); *H04L 27/2657* (2013.01); *H04L 27/2655* (2013.01)

(56) References Cited

OTHER PUBLICATIONS

"Flexible numerology for 5G", Nokia, Alcatel-Lucent Shanghai Bell, 3GPP TSG-RAN WG1 Meeting #85, R1-165024, May 23-27, 2016, 4 pages, Nanjing, P. R. China.
Written Opinion for PCT/JP2017/009110, dated May 30, 2017.
International Search Report for PCT/JP2017/009110, dated May 30, 2017.
Communication dated May 19, 2020, from the Japanese Patent Office in Application No. 2019-510463.
Convida Wireless, "Discussion on Sync Signals Supporting Different Numerologies", 3GPP TSG RAN WG1 Meeting #86, R1-167847, Aug. 22-26, 2016, Gothenburg, Sweden, pp. 1-4 (4 pages total).
Huawei, HiSilicon, "A common synchronization signal for a NR carrier supporting different numerologies", 3GPP TSG RAN WG1 Meeting #86, R1-167217, Aug. 22-26, 2016, Gothenburg, Sweden, pp. 1-7 (7 pages total).
NEC, "Discussion on numerology multiplexing", 3GPP TSG RAN WG1 Meeting #86, R1-166637, Aug. 22-26, 2016, Gothenburg, Sweden, pp. 1-2 (2 pages total).
Panasonic, "Use of multiple numerologies in NR", 3GPP TSG RAN WG1 Meeting #86, R1-167439, Aug. 22-26, 2016, Gothenburg, Sweden, pp. 1-9 (9 pages total).
Samsung, "Discussion on sync. signal considering forward compatibility aspects", 3GPP TSG RAN WG1 #86, R1-166744, Aug. 22-26, 2016, Gothenburg, Sweden, pp. 1-4 (4 pages total).
Samsung, "Overview on issues for NR initial access", 3GPP TSG RAN WG1 Meeting #86, R1-166796, Aug. 22-26, 2016, Gothenburg, Sweden, pp. 1-4 (4 pages total).
Xinwei, "Considerations on Initial Access Design", 3GPP TSG RAN WG1 Meeting #86, R1-166586, Aug. 22-26, 2016, Gothenburg, Sweden, pp. 1-6 (6 pages total).
ZTE, "Unified Synchronization Structure", 3GPP TSG RAN WG1 Meeting #86, R1-166422, Aug. 22-26, 2016, Gothenburg, Sweden, pp. 1-4 (4 pages total).

\* cited by examiner

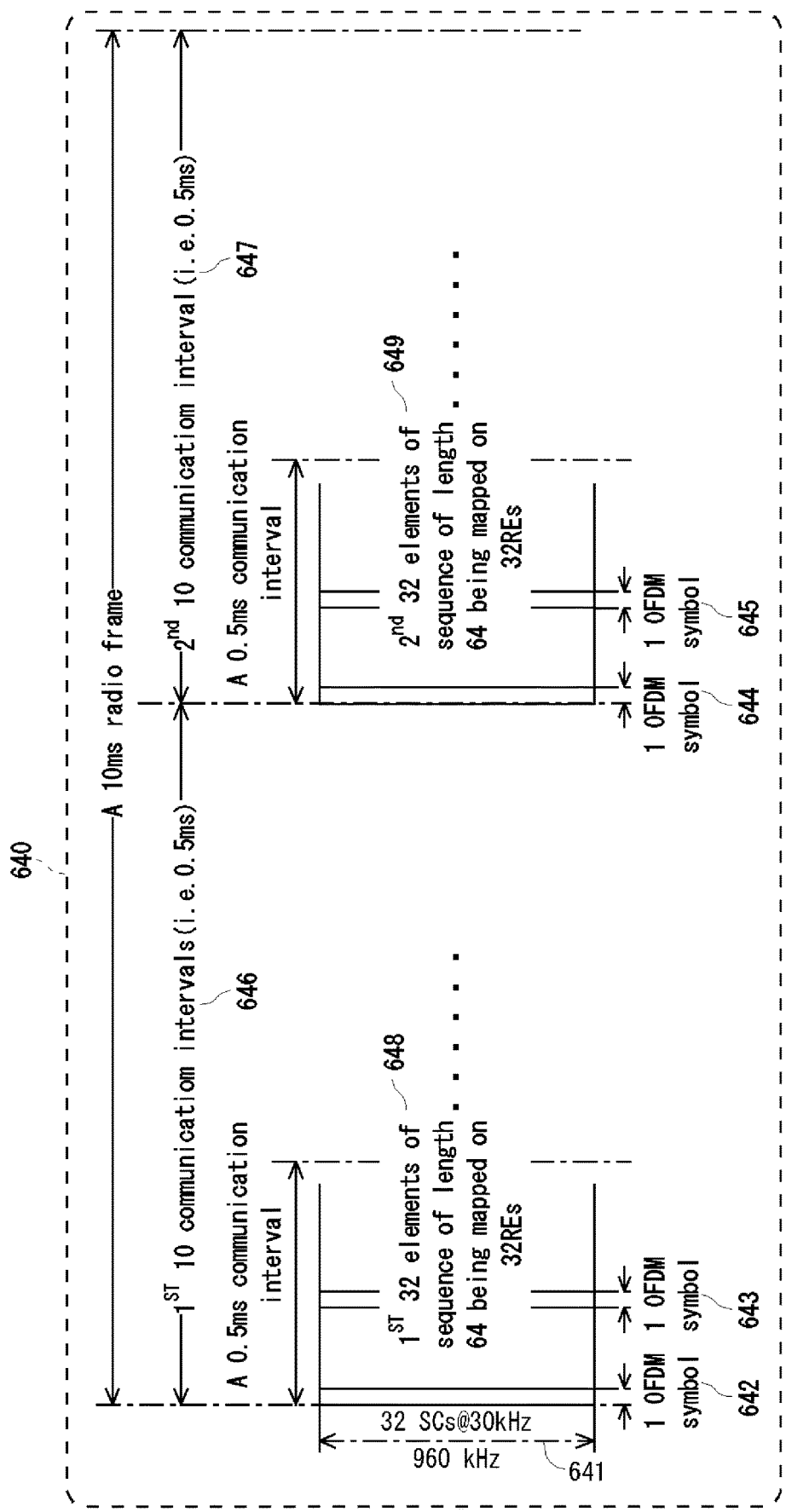

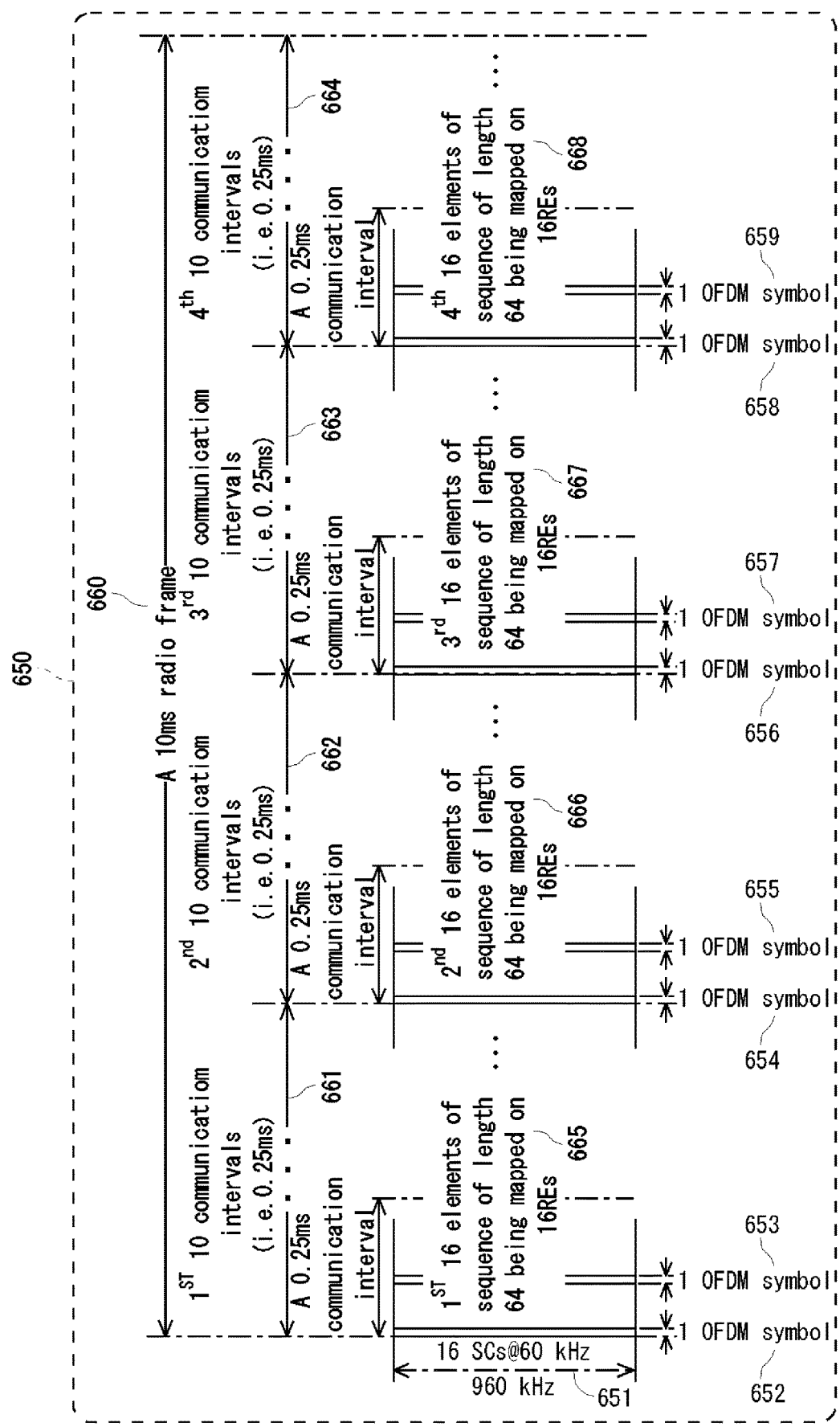

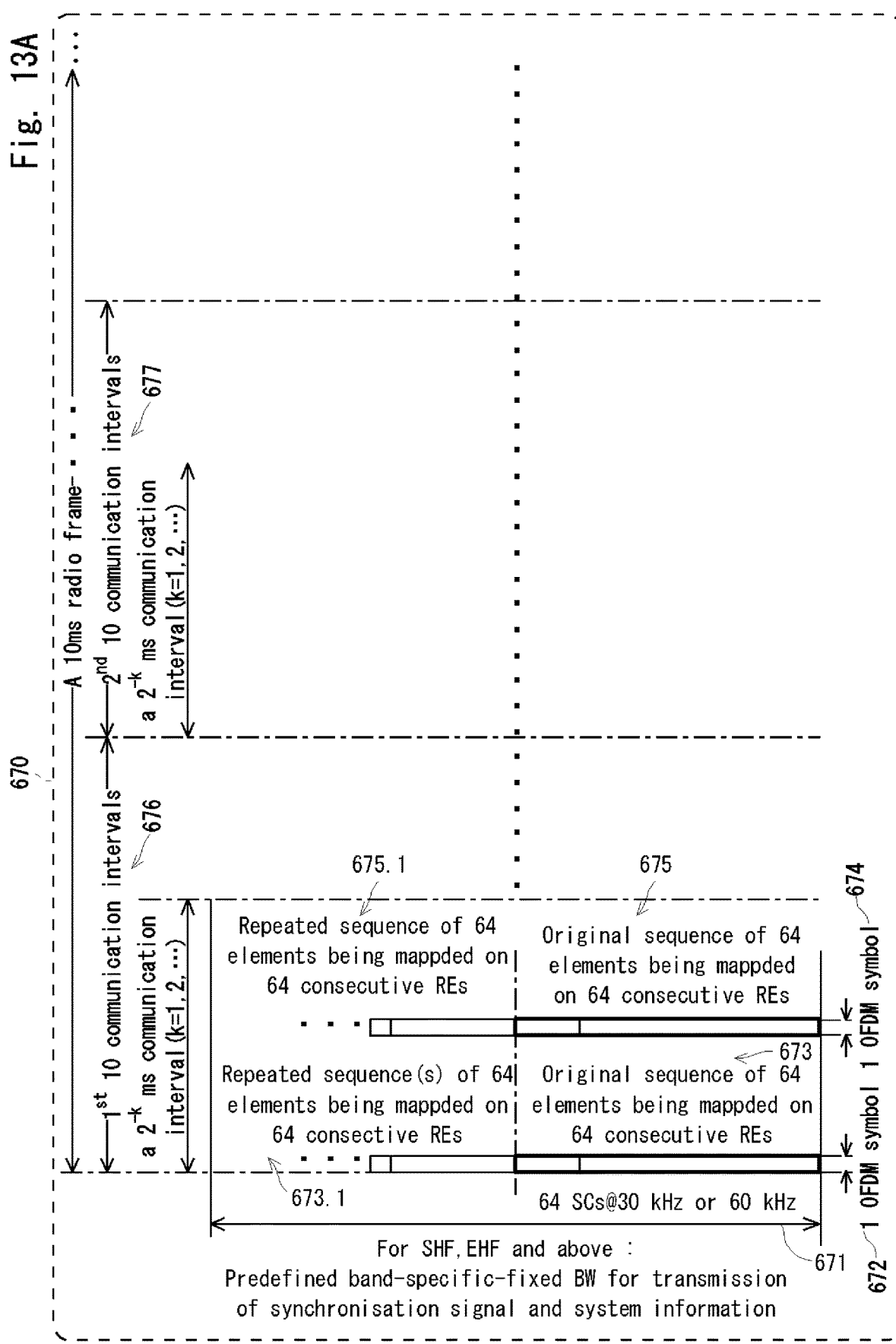

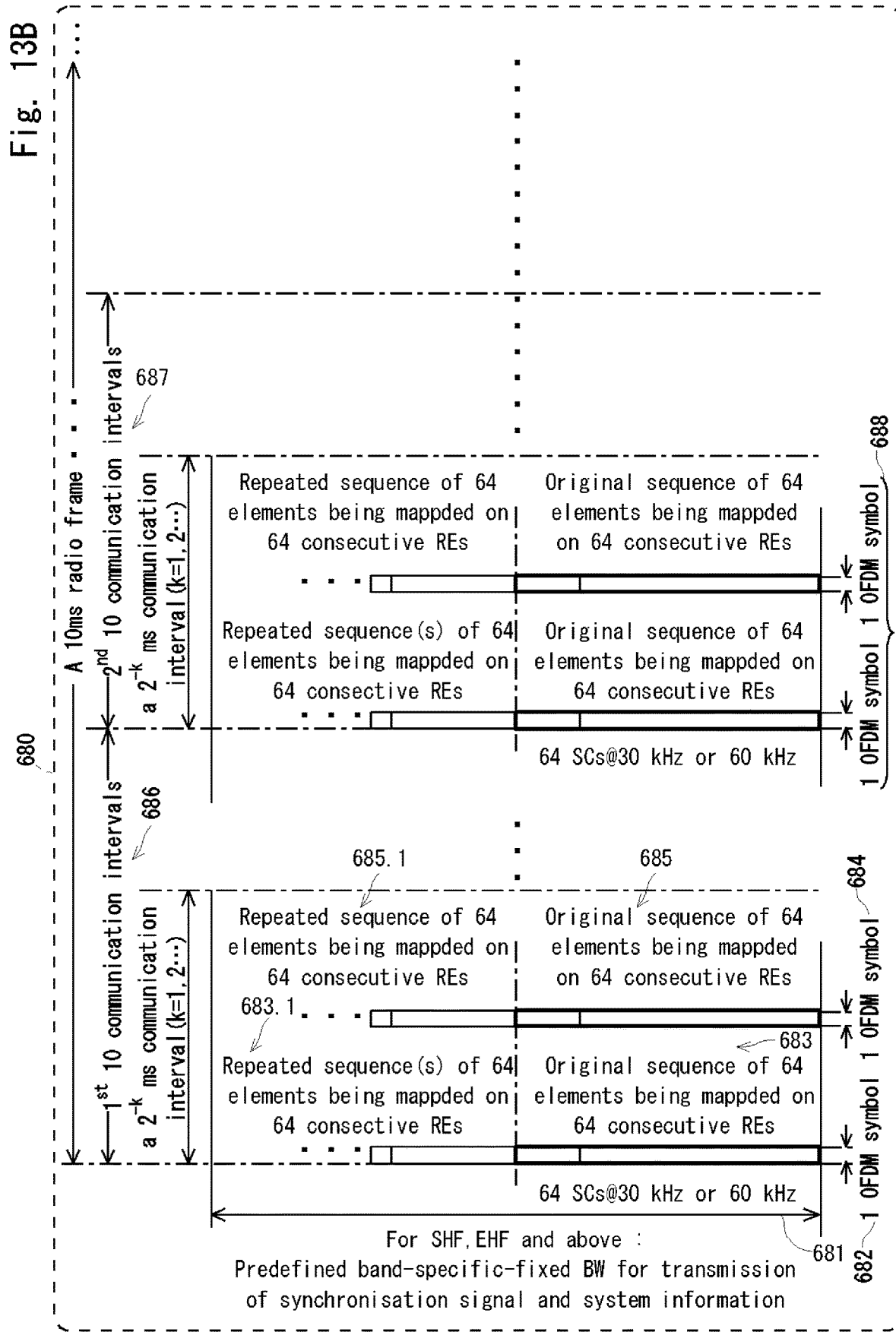

SYSTEM AND METHODS FOR REALISING ADAPTIVE RADIO ACCESS TECHNOLOGY IN 5G WIRELESS COMMUNICATION SYSTEM

CROSS REFERENCE TO RELATED APPLICATIONS

This Application is a National Stage of International Application No. PCT/JP2017/009110 filed Feb. 27, 2017, claiming priority based on Australian Patent Application No. 2016903365 filed Aug. 24, 2016, the disclosure of which is incorporated herein in its entirety by reference.

TECHNICAL FIELD

The present invention relates to advanced wireless communication. In particular, although not exclusively, the invention relates to providing adaptive radio access technology in a 5G wireless communication system.

BACKGROUND ART

ABBREVIATIONS

| | |
|---|---|
| 3GPP | 3$^{rd}$ Generation Partnership Project |
| 4G | 4th generation |
| 5G | 5th generation |
| DL | Downlink |
| EHF | Extremely-high frequency (30 GHz-300 GHz) |
| eMBB | Enhanced mobile broadband |
| eMTC | Enhanced machine type communication |
| FDMA | Frequency Division Multiple access |
| ICT | Information and Communication Technology |
| IMT | International Mobile Telecommunications |
| IoT | Internet of Things |
| ITU | International Telecommunication Union |
| ITU-R | International Telecommunication Union Radio |
| LTE | Long Term Evolution |
| LTE-A | LTE-Advanced (4G) |
| LTE-A Pro | LTE-Advanced Pro - LTE evolution system (4.5G) |
| M2M | Machine to machine communication |
| MCC | Mission critical communication |
| mMTC | Massive machine type communication |
| MTC | Machine type communication |
| OFDMA | Orthogonal Frequency Division Multiple Access |
| OOB | Out Of Band |
| QoE | Quality of Experience |
| QoS | Quality of Service |
| RAN | Radio Access network |
| RAT | Radio Access technology |
| RE | Resource Element |
| SA | System Aspects |
| SC-FDMA | Single Carrier - FDMA |
| SHF | Super-high frequency (3 GHz-30 GHz) |
| THF | tremendously high frequency |
| TSG | Technical Specification Group |
| UHF | Ultra-high frequency (300 MHz-3 GHz) |
| UL | Uplink |
| URLLC | ultra-reliable and low latency communication |
| VHF | Very-high frequency (30 MHz-300 MHz) |
| WLAN | Wireless local area network |
| WMAN | Wireless metropolitan area network |

Fourth generation (4G) 3GPP telecommunications systems are being successfully deployed at an accelerating pace all over the world. These systems enables more advanced services and applications that make use of the inherent benefits of LTE/LTE-A/LTE-Pro technologies, such as higher data rate, lower latency, enhanced coverage, and sidelink communication.

Much attention has now been focused on the development of the next generation technology and services, referred hereon as fifth generation (5G) technology. In particular, development of 5G systems is currently being investigated, with the target of commercial deployment of 5G systems commencing in 2020. In this regard, work has started in ITU and 3GPP in developing requirements for 5G systems, and to perform feasibility studies for technological specification development for new radio (NR) systems.

According to 3GPP TSG Radio Access Network (RAN), 3GPP is obliged to identify and develop the technology components, including NR access technology (also called new RAT), needed to satisfy both urgent market needs, and more long-term requirements, set forth by among others ITU. Furthermore, the NR access technology should be able to use any spectrum band ranging at least up to 100 GHz that may be made available for wireless communications even in a more distant future.

More specifically, 3GPP NR access technology (new RAT, N-RAT) shall be designed to meet a broad range of use cases including enhanced mobile broadband (eMBB), massive MTC (mMTC), critical MTC, mission critical communication (MCC) or ultra-reliable and low latency communications (URLLC).

3GPP's new RAT design and specification must also be inherently forward compatible and developed in two phases, namely PHASE-1 and PHASE-2. PHASE-1 RAT design and specification are to be forward compatible to PHASE-2 RAT design and specification. In particular, the PHASE-2 RAT design and specification shall be built on the foundation of the PHASE-1 design and specification, and will meet all the set requirements for the new RAT.

Furthermore, smooth technological evolution beyond the PHASE-2 is to be ensured to support later and more advanced features, and to enable support of new service requirements identified later than PHASE-2 specification.

In order to achieve forward compatibility for new RAT's design, and in particularly the NR air interface design, 3GPP TSG RAN has agreed to focus on a fundamental physical layer signal structure for new RAT (N-RAT), such as waveform and associated multiple access methods, basic frame and channel coding structures, radio interface protocol architecture and procedures, Radio Access Network architecture, interface protocols and procedures, and fundamental RF aspects.

OFDM has been proven an excellent waveform choice for 3GPP 4G systems (i.e. LTE, LTE-A, LTE-A Pro) and other wireless systems such as WLAN and WMAN. In short, OFDM provides excellent spectrum efficiency, can be processed and handled with the processing levels achievable in current handsets or user equipment, and operates well with high data rate stream occupying wide bandwidths. OFDM also operates well in situations where there is selective fading.

Although OFDM has been proven to be a great success so far in 3GPP 4G, it may not be sufficiently efficient for use in 5G or N-RAT systems.

A recent study in 3GPP TSG RAN-WG1 concluded that OFDM-based waveforms supporting multiple numerologies on a single component carrier shall be used as baseline waveforms for N-RAT, and that non-OFDM based waveform are not precluded from use. Furthermore, it was concluded that a largest component carrier bandwidth shall not be smaller than 80 MHz for at least one numerology.

Multiple pre-designed numerology OFDM-based waveforms may be multiplexed in time, or in frequency, or in frequency-time hybrid fashion on a servicing component carrier, where an OFDM-based waveform numerology parameter set is statically configured. However, such static configuration of OFDM based waveform numerology parameters does not provide forward-compatibility. Furthermore, the statically configured numerology parameter sets may not be optimal for future services. Additionally, such static configuration is not desirable as traffic generated by one or more services may change with time and/or geographical location.

FIG. 1 schematically illustrates an overview 100 of a new radio (NR) or 5G services space, which includes enhanced mobile broadband (eMBB) services 101, enhanced vehicle-to-everything (V2X) communication services 102, enhanced MTC/massive MTC (eMTC/mMTC) services 103, ultra-reliable and low latency communication (URLLC) services 104 and enhanced network operation services 110.

The eMBB services 101 demand low latency, higher bandwidth, higher spectral efficiency, and higher user experience throughput, for realising augmented reality and/or virtual reality applications.

The V2X communication services 102 require support of real-time communication, event-trigger and periodic communication, latency-intolerant communication, and ultra-reliable communication suitable for being used in Intelligent Transport system (ITS) and/or autonomous driving.

The eMTC/mMTC services 103 requires link budget improvement, low-complexity device, long battery life, very high density devices deployment, extended network coverage, passive communication, generating intermittent short burst of data traffic, and delay-tolerant as well as delay-intolerant communication for use in M2M and/or IoT.

The URLLC services 104 requires instant network access service, delay-intolerant and packet-loss intolerant services for use in mission critical communication and/or public safety.

The enhanced network operation services 110 require supporting RAN virtualisation and slicing under software control, multi-RAT connectivity, various service's bandwidth or data-rates demands, complex connectivity/routing model, more efficient multicast methods, distributed network functions deployment, more flexible and resilient with enhanced capability, and interworking.

The NR services space further includes forward-compatibility 120, which requires supporting newly created services having newly-defined traffic patterns.

Among the identified services for the NR systems, eMBB 101, eV2X 102, eMTC/mMTC 103, URLLC 104, and forward-compatibility 120 directly impact NR interface physical design, eMBB 101, eV2X 102, eMTC/mMTC 103 and URLLC 104 are for urgent market needs, and each require a specific OFDM-based waveform numerology parameter set and subband configuration(s) designed for meeting its identified service requirements and/or demands.

Forward compatibility 120 can be considered as a placeholder for future services where one or more OFDM-base waveform numerology parameter sets cannot be optimally specified now.

As such, there is clearly a need for improved systems and method for realising adaptive radio access technology in advanced wireless communications systems.

It will be clearly understood that, if a prior art publication is referred to herein, this reference does not constitute an admission that the publication forms part of the common general knowledge in the art in Australia or in any other country.

SUMMARY OF INVENTION

Technical Problem

The present invention is directed to advanced wireless communications systems and methods, which may at least partially overcome at least one of the abovementioned disadvantages or provide the consumer with a useful or commercial choice.

Solution to Problem

With the foregoing in view, the present invention in one form, resides broadly in a method for use in an advanced wireless communication system, to provide adaptive radio access using a plurality of configurable OFDM-based waveforms, the method comprising:

receiving, at a UE and on a band-specific fixed system subband, one or more synchronisation signals;

determining, at the UE, and according to the synchronisation signals, a base waveform numerology; and receiving, at the UE and according to the base waveform numerology, system information, wherein the system information defines parameters for a service or services.

Preferably, the synchronisation signals comprise a first synchronisation signal and a second synchronisation signal.

Preferably, the first synchronisation signal defines values of the base waveform numerology, and a cell identity.

Preferably, the second synchronisation signal defines a frame timing, a cell identity group, periodic based-NCI(s) carrying system information messages, and information on reference signals for the further reception and decoding of system information messages.

Preferably, the system information defines an operational bandwidth, system timing, system broadcast cycle, number of configured subbands, subband-widths, a subband multiplexing arrangement and values of the configured waveform numerologies or information elements for use in signal transmission/reception in a future broadcast cycle.

Preferably, the method further comprises: monitoring one or more in-subband control channels for further in-subband data channels reception and/or transmission.

Preferably, the system information includes information elements (IEs) for configuring an OFDM-based waveform (s) for further services in a NR system.

Preferably, the IEs include an NR communication interval (NCI), a subcarrier-spacing, and a subband-width.

Preferably, the system information includes a subcarrier-spacing IE in the form of an index associated with a subcarrier-spacing value in a predefined set.

Preferably, subcarrier-spacing values in the predefined set satisfy $\{(15\times2^k) \text{ kHz}\}$ where k is an integer.

Preferably, the method further comprises reconfiguring the predefined set of subcarrier-spacing values to add or remove one or more subcarrier-spacing values.

Preferably, the system information includes a subband-width IE, indicating a number of consecutive resource blocks (RBs) forming a configured subband.

Preferably, different configured waveforms for signal transmission and/or reception are frequency-multiplexed, for use by multiple services simultaneously.

Preferably, the system information includes a subband-frequency-offset, defining an arrangement of frequency-multiplexed subbands.

Preferably, the subband-frequency-offset defines an offset with reference to a number of resource blocks (RBs) of based-subcarrier-spacing.

Preferably, waveform reconfiguration occurs at every NR system broadcast cycle.

Preferably, the NR system broadcast cycle comprise one or multiple intervals of four (4) LTE radio-frames.

Preferably, the start of a first NR system broadcast cycle is aligned with a start of a first LTE radio frame.

Preferably, multiple NR system broadcast cycles are provided in a super frame of 1024×10 ms.

Preferably, an NR system broadcast cycle may comprise (2"×10) NR Communication Intervals (NCIs), where n is a natural number.

Preferably, an NCI of an NR system broadcast cycle within a particular configured subband may be reserved for downlink signal transmission, assigned for uplink signal transmission or used for time-multiplexed downlink and uplink signals transmission.

Preferably, each NCI comprise two equal halves.

Preferably, the first half and the second half of an NCI comprise a predefined number of OFDM-based symbols.

Preferably, a first symbol of the first half and a first symbol of the second half may be used for the transmission of first and second synchronisation signals.

Preferably, an NR system information message, and its reference signal are transmitted on the remaining symbols.

Preferably, the NR system information message is repeated at most three times per NR system broadcast cycle;

Preferably, at most one NR system information message is transmitted per radio frame.

Preferably, the NR system information message is mapped for transmission on one or more NCIs within a radio frame.

Preferably, a fixed length sequence is used for the synchronisation signals.

Preferably, a number of subcarriers within band-specific fixed system subband is equal to the number of elements defining the length of the fixed length sequence.

Alternatively, a number of subcarriers within the band-specific fixed system subband is $(2^R, R=\{1,2,\ldots\})$ times the number of elements defining the length of the fixed length sequence.

Alternatively, a number of subcarriers within the band-specific fixed system subband is $$\left(\frac{1}{2^S}, S = \{1, 2, \ldots\}\right)$$

times the number of elements defining the length of the fixed length sequence.

Preferably, one segment of the fixed length sequence is allocated for the mapping of a based-NCI.

Preferably, other segments of the fixed length sequence are allocated for the mapping of one or more NCIs with the same index within a radio frame.

Preferably, subband NCIs that partially or fully align with a based-NCI are reserved for DL signal transmission.

Preferably, the method further comprises: choosing, at an access node, a base waveform for transmission of the synchronisation signals and NR system information messages within the band-specific fixed system subband.

Preferably, the method further comprises: determining an inter-cell interference coordination strategy, and selecting NCI index for transmitting the system information according to the inter-cell interference coordination strategy.

Preferably, the method further comprises: periodically transmitting original system information on consecutive subcarriers of the band-specific fixed system subband, and in symbols that are not reserved for the synchronisation signals.

In another form, the invention resides broadly in an advanced wireless communication system including:

an advanced base station configured to provide adaptive radio access using a plurality of configurable OFDM-based waveforms;

a UE, in communication with the based station, the UE configured to:
  receive, from the base station and on a band-specific fixed system subband, one or more synchronisation signals;
  determine, according to the synchronisation signals, a base waveform numerology; and
  receive, from the base station and according to the base waveform numerology, system information, wherein the system information defines parameters for a service or services provided at the base station.

Embodiments of the present invention is directed to systems and methods for use in an advanced wireless communication system such as the fifth generation (5G) or New Radio (NR) 3GPP system, providing adaptivity by enabling optimum waveform to be used for different situations, services, or traffic patterns, at different times and/or for different targets. Furthermore, in the system, one or multiple optimally designed waveforms may be further configured/reconfigured for concurrent signal transmission and/or reception within the same system bandwidth, and to adapt to a key service demands or multiple service demands.

In one broad form, the present invention relates to a system information broadcast and signalling method assisting in realising an adaptive solution for use in an advanced wireless communication system, where the advanced wireless communication system comprising an advanced network radio access node providing multiple services in a defined area; and a first advanced user equipment (UE) being capable of simultaneously using multiple services provided by the network radio access node, and/or a plurality of second advanced UEs concurrently using multiple services provided by the network radio access node where each second advanced UE may be only capable of using one different provided service at a time.

In a basic operation, the advanced wireless communication system is capable of configuring and reconfiguring an advanced network radio access node at least upon a service demand to select an optimum waveform at a time for signal transmission/reception to/from multiple first and/or second UEs.

In a more advanced operation, the advanced wireless communication system may be capable of configuring and reconfiguring an advanced network radio access node upon demands of multiple services to concurrently use multiple optimum waveforms on a system operational bandwidth at a time for signal transmission/reception to/from first UE(s) who may concurrently use multiple network provided services, and/or plurality of second UEs who may concurrently use different network provided services.

In a joined services or heterogeneous network operation, the advanced wireless communication system may be capable of configuring and reconfiguring two or more advanced network radio access nodes upon demands of local services to form a heterogeneous network where the network radio access nodes share the same system operational bandwidth but use different waveforms for signal transmission/reception to/from first UE(s) who concurrently use multiple services provided by the network radio access nodes, and/or multiple second UEs who may concurrently use different network provided services.

Statistics show that traffic generated by a service vary in time and/or geographical location due to UE distribution, usage profiles, activity profiles and mobility. Furthermore, services on demand, number of services in demand and their generated traffic also change in time and by geographical location. By following an approach of using one or more optimum waveforms and associated resource allocation for achieving optimal quality of service (QoS) and/or quality of experience (QoE) on one or more services in demand, the advanced wireless communication system may adaptively change waveform when servicing the UEs, the number of configured waveforms for use, and their resource allocation at an advanced network radio access node from time to time.

The advanced network radio access node communicates the changes to advanced UEs (in idle-mode or connected-mode) under its coverage. Additionally, a waveform may be considered optimal for use in one frequency band but may not be optimal for use in other frequency bands, and therefore further requires an advanced wireless communication system to adaptively change waveform(s) for servicing at an advanced network radio access node according to deployed frequency band, where the change of waveform for initial network access is seamlessly detectable at an advanced UE.

According to embodiments of the present invention, a system operational bandwidth for use at an advanced network radio access node may be configured to comprise one or more frequency-multiplexed subbands i.e. portions of a wideband spectrum. Among the configured subbands, there may be a configurable system subband where its minimum fixed subband-width may be predefined according to a band-specific (e.g. 1080 kHz for UHF) and maximum configured subband-width being equal to the system operational bandwidth.

Depend-on the identified needs, such as frequency band, keyed service, and/or desired coverage, an optimum waveform can be further configured as a base waveform for signal transmission and reception on the system subband. In order to provide system information to advanced UEs under its coverage for further network access, an advanced network radio access node periodically broadcasts system information and synchronisation signals within the centre of the predefined band-specific fixed BW (e.g. 1080 kHz for UHF) for synchronisation signals and system information.

The specific mapping of synchronisation signals enables an advanced UE to detect the base waveform numerology. In particular, acquisition of synchronisation signals enables an advanced UE to detect symbol timing, communication interval timing, frame timing, and control information for the reception and decoding of channel carrying the broadcasted system information messages and acquisition of system information further enables an advanced UE to retrieve system operational bandwidth, system timing, system broadcast cycle, number of configured subbands within the system operational bandwidth, and subbands' configuration.

Furthermore, acquisition of a subband configuration may further enable an advanced UE to perform in-subband control channel monitoring for further service data channels reception and/or service data channels transmission.

In one aspect of the present invention, the system information is periodically broadcasted every system broadcast cycle. The number of subbands and subband configurations being broadcasted in the current system broadcast cycle are applied for use in the next following system broadcast cycle.

A subband configuration may further comprise a subband-frequency-offset indicating a position of a configured subband relative to the carrier frequency or a central of the system subband. A subband-width may indicate a number of resource blocks being distributed around the configured subband-frequency-offset, subcarrier-spacing, and communication interval.

A system broadcast cycle may be predefined to comprise one or multiple intervals of 4 LTE radio frames (i.e. 40 ms), and multiple predetermined system broadcast cycles may be further concatenated to fit into a super frame of 1024×10 ms such that the start of the first system broadcast cycle in the super-frame is aligned with the start of the first LTE radio frame.

Depending on the configured base waveform for the system information broadcast, a system broadcast cycle may comprise ($2^n \times 10$, $n \in N$) communication intervals. For assisting inter-cell interference coordination in broadcasting system information, any communication interval(s) with an index in the range [0:9] within a system broadcast cycle can be selected for the transmission of system information messages, satisfying condition that there is at least one system information message transmission (original) per system broadcast cycle, and there is at most four system information message transmissions (original message and repetitions) per system broadcast cycle, and where there is at most one system information message transmission (original message or repetition) per radio frame.

According to embodiments of the present invention, at an advanced network radio access node, a communication interval may be reserved for downlink signal transmission, or scheduled for uplink signal reception, or flexibly shared for concurrent downlink signal transmission and uplink signal reception, or sidelink communication. The communication interval may further comprise two equal halves where each half comprises a fixed number of OFDM-based symbols.

In a communication interval being selected for the mapping of a channel carrying system information messages, the first symbols of each half are reserved for the mapping of synchronisation signals assisting an advanced UE in detecting based communication interval timing, and the remaining symbols are for the mapping of a channel carrying system information message and its reference signal.

In another aspect of the present invention, regardless of the base waveform being configured for synchronisation signals and system information transmission, the synchronisation signals may be always mapped for transmission on subcarriers within a predefined band-specific fixed BW for synchronisation signals (e.g. 960 kHz for UHF) within a system subband. A sequence of fixed length, e.g. 64 elements long, is used for the first and second synchronisation signals. Depending on the configured based-waveform, the number of subcarriers within the predefined band-specific fixed BW for synchronisation signals (e.g. 960 kHz for UHF) may be equal to the number of elements of a designed sequence enabling one to one mapping. Alternatively, a number of subcarriers within the predefined band-specific fixed BW for synchronisation signal may be ($2^R$, $R=\{1,2,\ldots\}$) times number of elements of a sequence, that may further require the $2^R$ repetitions of the sequence prior to mapping. Alternatively, a number of subcarriers within the predefined band-specific fixed BW for synchronisation signal (e.g. 960 kHz for UHF) may be $$\left(\frac{1}{2^S}, S=\{1,2,\ldots\}\right)$$

times number of elements of a designed sequence, that may further require the $2^S$ partitions of the sequence for being mapped on different communication intervals with the same index within a radio frame.

Upon detecting a full sequence, or number of repeated sequence, or different sections of a sequence in different communication intervals, an advanced UE is able to derive the based-waveform numerology including subcarrier spacing and communication interval.

Advantageously, embodiments of the present invention provide design and mapping of synchronisation signals specifically for the waveform in use with system information broadcasts, enabling the adaptive selection of optimum based waveform basing on the needs/deployment.

Furthermore, multiplexing of multiple waveforms of different numerologies on different portions of spectrum in a wideband radio system and associated system signalling enables implicit OOB interference management, and further assists in the reconfiguration of waveforms without impacting existing UE in services or new UEs entering the cell.

Finally, forward compatibility is enabled, where new waveforms can be added for use in the future without a change of the system.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings.

FIG. 12A illustrates an exemplary synchronisation signal transmission configuration, according to an embodiment of the present invention.

FIG. 12B illustrates an exemplary synchronisation signal transmission configuration, according to an embodiment of the present invention.

FIG. 13A illustrates an exemplary synchronisation signal transmission configuration, according to an embodiment of the present invention.

FIG. 13B illustrates an exemplary synchronisation signal transmission configuration, according to an embodiment of the present invention.

DESCRIPTION OF EMBODIMENTS

Figure 1:
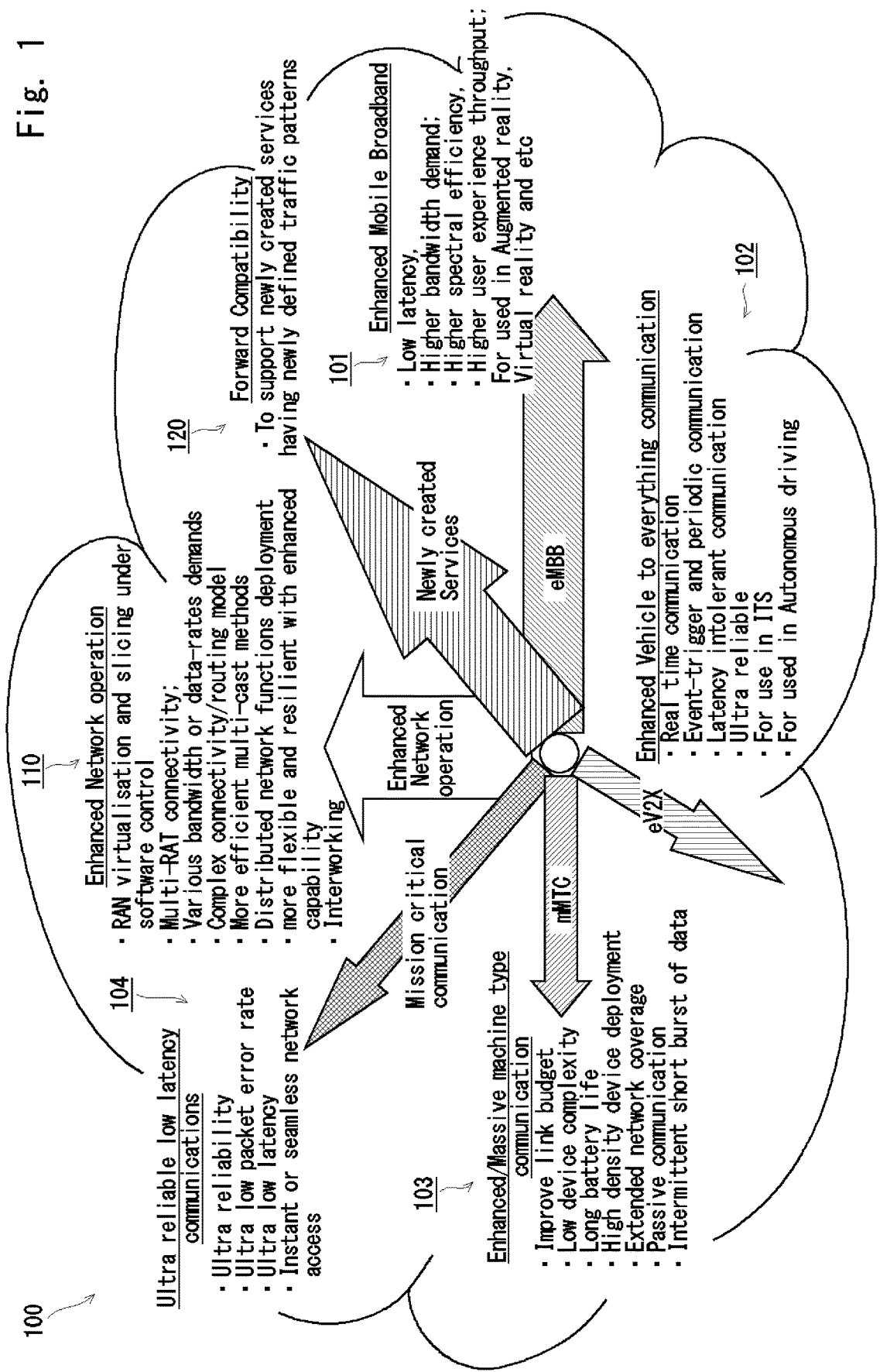
FIG. 1 schematically illustrates an overview of a new radio (NR) or 5G services space.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

Systems and methods are described below that provide an adaptive RAT (Radio Access Technology) in 5G systems by using different waveforms for different situations, services, or traffic patterns, at a given time and/or on a given target.

One method includes generating and mapping synchronisation signals for periodic transmission in a reserved portion of spectrum in a wideband radio system, allowing blind-detection of a base waveform numerology used for broadcasting system information. As such, the method enabling base waveform reconfiguration, which in turn can be used to reconfigure waveforms in the full spectrum. The method may further include generating and periodically transmitting system information, to inform UEs of other waveforms and their numerology that will be configured for services in other portions of spectrum in a wideband radio system.

Systems described herein are designed and specified in such a way that an NR system component carrier can be configured and reconfigured to have one or more OFDM-based waveforms being multiplexed or switched in time, or in frequency, or in time-frequency combination, to adapting to the demand on one or more services in a cell's coverage. Each configured OFDM-based waveform is associated with a numerology parameter set catering for one or more service traffic patterns.

Additionally, the systems are designed to allow reconfiguration where one or more OFDM-based waveforms having different numerologies can be adaptively removed or added to existing servicing NR component carriers, with no impact on operational users and/or incoming users. The reconfiguration comprises adding or removing OFDM-based waveforms to enable optimal spectral utilisation, which may enhancing QoE of UEs, and allow new services requiring newly-design waveforms being generated added without any impact on the NR system physical design.

In order to achieve the above mentioned adaptive solution using an optimum waveform for any given service, or given traffic pattern, at given time and/or on a given target, and where one or more optimally designed waveforms are multiplexed on a single component carrier enabling concurrent support of multiple services, the system enables serviced UEs to realise the configurability of multiple OFDM-based waveforms or similar being multiplexed on a servicing NR component carrier, to enable concurrently supported services with different QoS on a single NR component carrier. In particular, each configured waveform may have a specifically designed numerology parameter set, and can be configured/reconfigured to span over a configurable sub-band(s) to accommodate the traffic of the said service at a given time. Furthermore, the system and methods also allow one or more waveforms in the same categories with newly design numerologies to be added in the future or one or more existing waveforms with one or more numerology parameters to be enhanced adapting to deployment scenarios.

The term system subband herein relates to a portion of a spectrum being configured within a larger system bandwidth where its minimum subband-width is predefined fixed according to band-specific for synchronisation signal and system information transmission which can be implicitly assumed at a UE.

Figure 2:
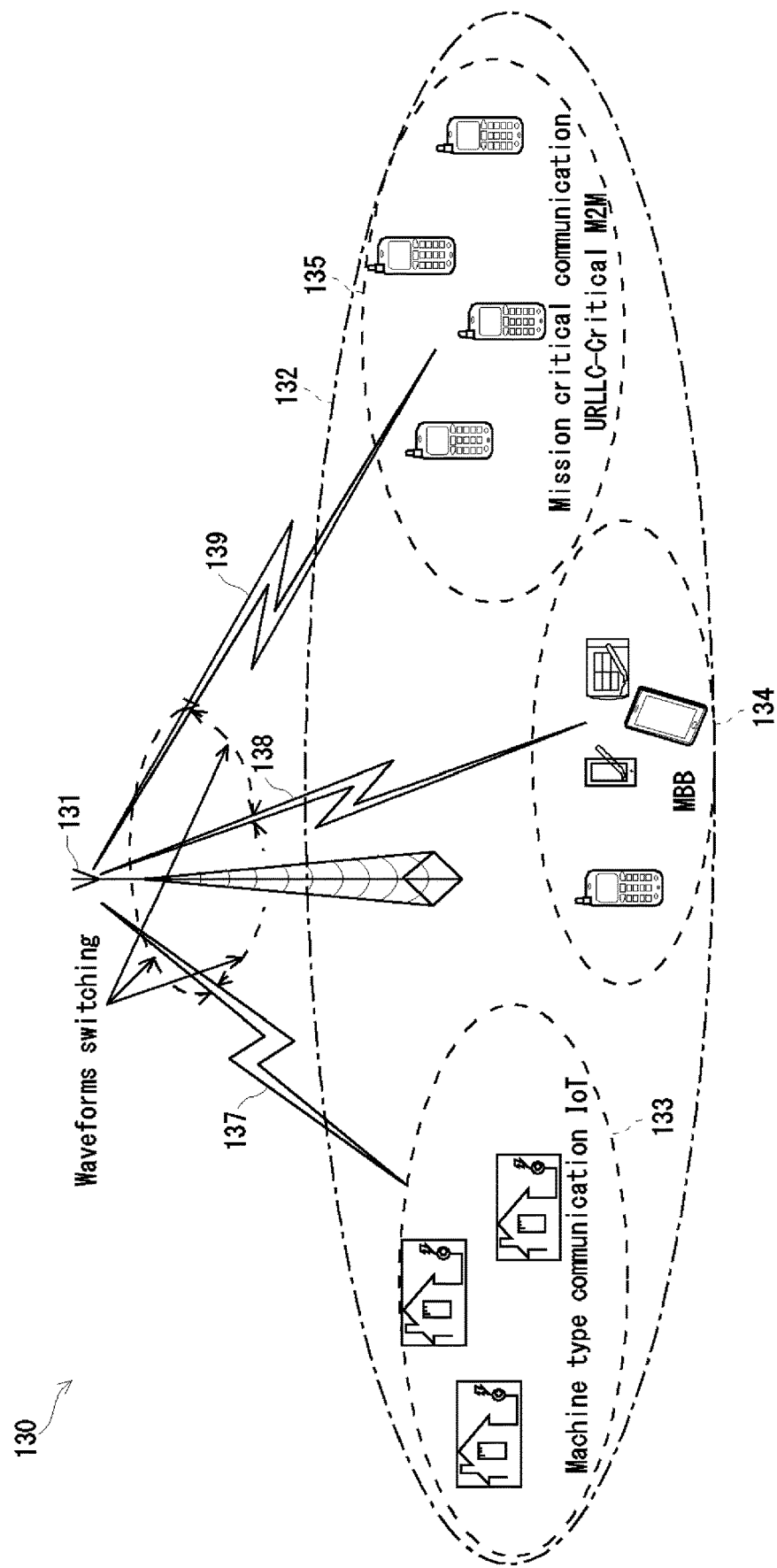
FIG. 2 illustrates an advanced wireless communication system, according to an embodiment of the present invention.

FIG. 2 illustrates an advanced wireless communication system 130, according to an embodiment of the present invention. The system 130 includes waveform adaptation where multiple waveforms are adaptively multiplexed on the same component carrier. This provides versatility, and enables the system 130 to be efficiently used for multiple services that have different requirements, and thus enables the system 130 to meet a broad range of use cases.

As described in further detail below, the system 130 is configured to choose a waveform for the transmission of data streams to UEs at one time to meet certain service needs (e.g. quality of service (QoS) or quality of experience (QoE) based needs), and then adaptively change to another waveform for the transmission of data streams to UEs at another time to meet other service needs at that time.

The advanced wireless communication system 130 comprises a single cell network including an advanced network radio access node 131 that is configured to monitor traffic in the system 130, and adaptively select waveforms for signal transmission and reception based thereon. The selection of waveform is performed regularly to ensure that the waveform matches the needs of the system at that time.

The system 130 includes a plurality of machine type communication (MTC) devices 133, mobile broadband (MBB) UEs 134, and mission critical communication (MCC) UEs 135 which are all under the coverage 132 of the advanced network radio access node 131.

Depending on the time of a day, geographical location, or events occurring, the devices and UEs 133, 134, 135 may have different transmission requirements, and as such different configurations may be provided. For example, in a region where MTC devices 133 are smart meters for remote reporting of meter data, the MTC devices 133 may be scheduled to communicate at night and using a first waveform 137 for signal transmission/reception.

During the day, where the most MBB UEs 134 are active, a second waveform 138 may be configured for signal transmission/reception.

Upon occurrence of an incident, or as a result of a scheduled event, a high number of MCC UEs 135 may concurrently require network services. The radio access node 131 may in such case be configured to switch to a third waveform 139 for signal transmission/reception, to fulfil the needs of prioritised MCC services.

While the system 130 is configured to adaptively select waveforms based upon the needs of the system, a waveform that is optimal for (or designed for) a service, can be used for signal transmission/reception of other services. As an illustrative example, the second waveform 138, which is optimised for the MBB UEs 134, may be used occasionally with MTC devices 133 or MCC UEs 135, even though it may not be the most effective use of spectrum or resources, or provide the highest possible QoE.

Figure 3:
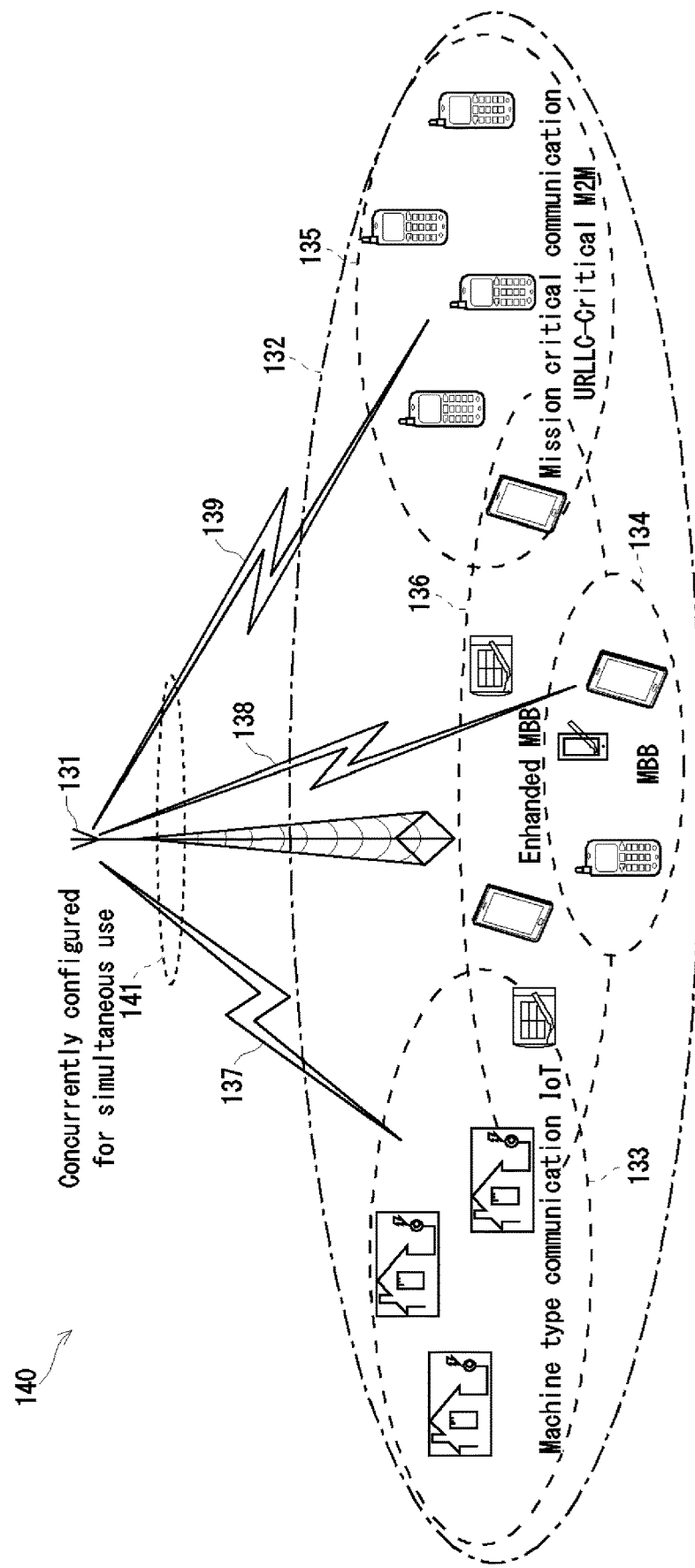
FIG. 3 illustrates an advanced wireless communication system, according to an embodiment of the present invention.

FIG. 3 illustrates an advanced wireless communication system 140, according to an embodiment of the present invention. The system 140 is similar to the system 130, but includes more advanced waveform adaptation.

The advanced wireless communication system 140 comprises a single cell network including an advanced network radio access node 131 and a plurality of UEs grouped into an MTC group 133, an MBB group 134, an MCC group 135 and an Enhanced MBB (eMBB) group 136.

The advanced network radio access node 131 is configured to multiplex different waveforms to meet target QoS and/or QoE requirements of each of the groups 133, 134, 135 on different portions of the spectrum 141. Several of the groups 133, 134, 135 may simultaneously require network services at a network radio access node, and in such case, the system 140 may be configured with multiple different waveforms at the same time, to enable the transmission and reception of data concurrently on the same component carrier using the different waveforms.

Furthermore, data streams at an advanced UE may relate to multiple concurrent services and those data streams may be channel encoded, modulated and multiplexed with data streams of other users, using multiple waveforms. As an illustrative example, a UE of the eMBB group 136 may be capable of performing signal reception/transmission on multiple different waveforms 137, 138 and/or 139 concurrently, and therefore simultaneously utilising multiple network services.

Figure 4:
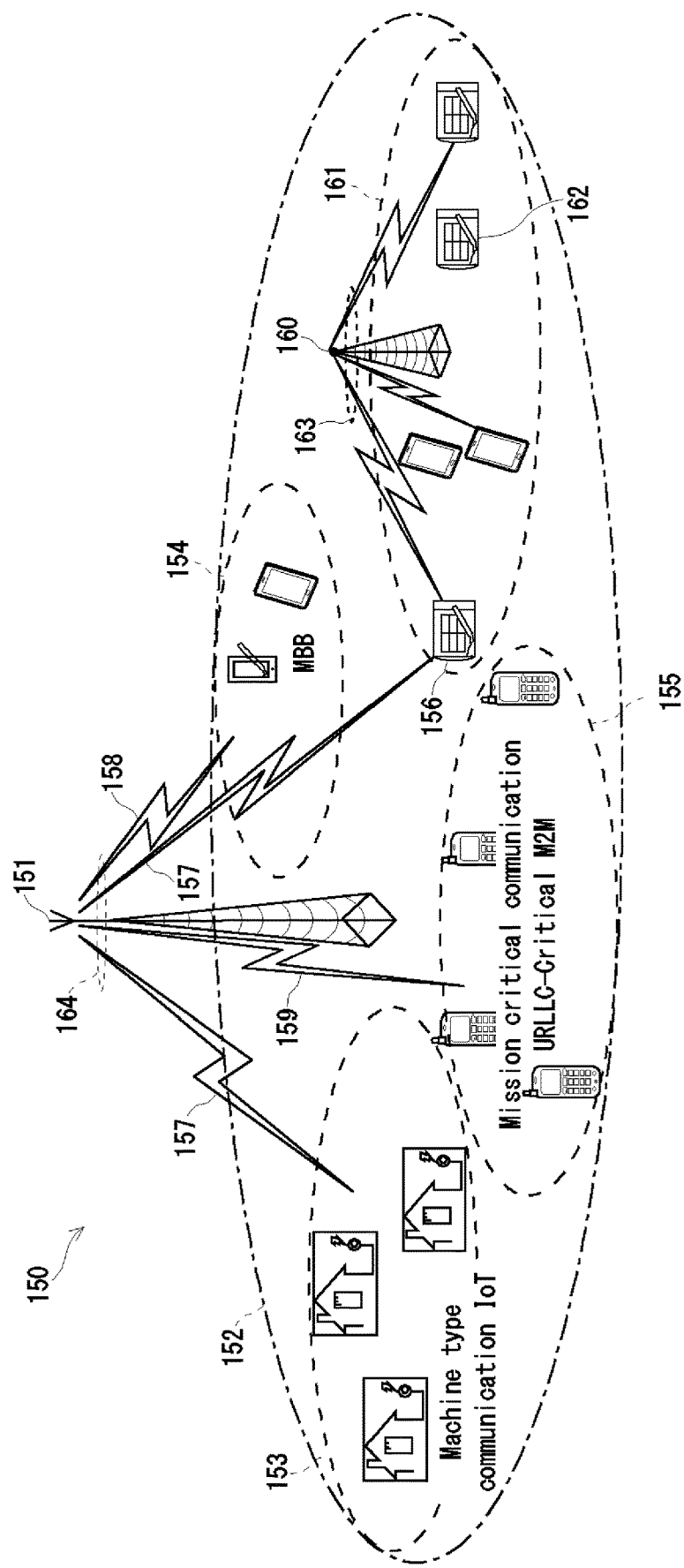
FIG. 4 illustrates an advanced wireless communication system, according to an embodiment of the present invention.

FIG. 4 illustrates an advanced wireless communication system 150, according to an embodiment of the present invention. The advanced wireless communication system 150 comprises a heterogeneous network and includes adaptive waveform adaptation.

The advanced wireless communication system 150 is capable of configuring and reconfiguring two or more advanced network radio access nodes to share the same spectrum fully or partially, where each advanced network radio access node may choose waveforms for signal transmission/reception on different portions of a spectrum, for interference management and/or to improve spectrum efficiency.

The advanced wireless communication system 150 includes a first advanced network radio access node 151 having first coverage 152, and a remote radio head (RRH) as a second advanced network radio access node 160 having second coverage 161, the second coverage 161 within the first coverage 152.

The advanced wireless communication system 150 further includes a group of MTC/IoT UEs 153, a group of MBB UEs 154 and a group of MCC/URLLC/Critical M2M UEs 155. The first radio access node 151 is configured to adaptively select multiple waveforms 157, 158, 159 for multiplexing, on different portions of a spectrum 164, transmission to the MTC/IoT group 153, the MBB group 154 and the MCC/URLLC/Critical M2M group 155.

The second advanced network radio access node 160 is configured to serve first UEs 156, and second UEs 162. In particular, the second radio access node 160 is configured to adaptively select a waveform for the transmission/reception of data streams to/from UEs 156, 162 in its coverage 161 and on a spectrum where one or more portions may be overlapping the spectrum for use at the first radio access node 151.

The UE 156 is capable of performing signal reception/transmission using multiple different waveforms 163, 157 concurrently, and therefore simultaneously receive network services provided by the first and second radio access nodes 151, 160.

Figure 5:
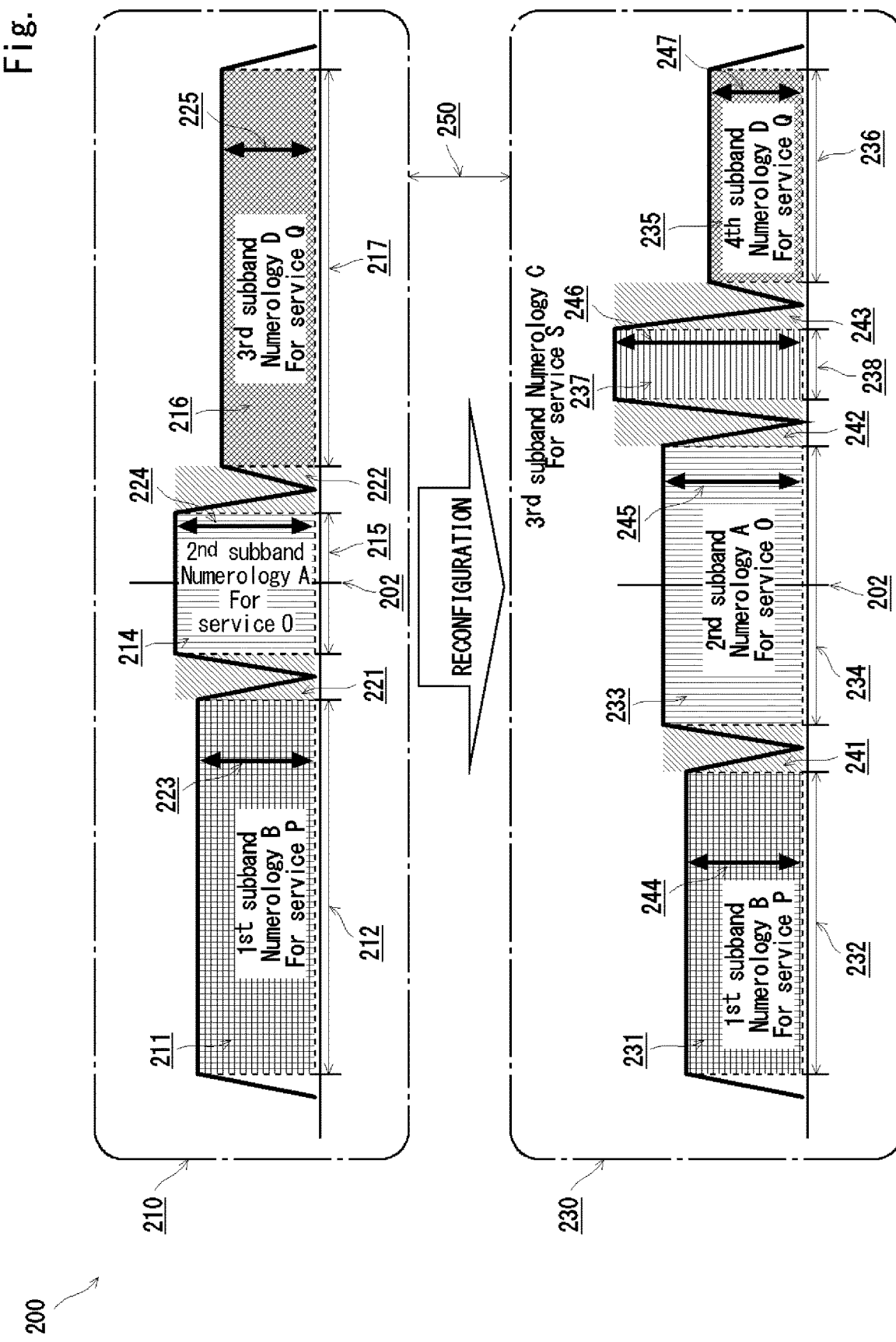
FIG. 5 illustrates a component carrier configuration of an advanced wireless communication system, according to an embodiment of the present invention.

FIG. 5 illustrates a component carrier configuration 200 of an advanced wireless communication system, according to an embodiment of the present invention. The configuration includes multiple OFDM based waveforms, where each is optimally designed for a service or specific use, and illustrates multiplexing of multiple numerologies at configurable sub-bands.

An initial configuration 210 is applied on a component carrier with carrier frequency 202, to fulfil demands of services at a first point in time, such as service P, service O and service Q. Based on the demands of the services, and potentially one or more quality of experience (QoE) requirements, the component carrier is initially configured to use a first waveform 211 and numerology B with a first maximum allocated transmit-power 223 and in a first configured subband 212 having a first size, for use by service P.

The component carrier is further configured to use a second waveform 214 and numerology A with a second maximum allocated transmit-power 224 in a second configured subband 215 having a second size, for use by service O. Finally, the component carrier is configured to use a third waveform 216 and numerology D with a third maximum allocated transmit-power 225 in a third configured subband 217 having a third size, for use by service Q.

The sub-bands 212, 215, 217 are configured such that guard bands 221, 222 are provided between adjacently configured sub-bands, i.e. between the first and second subbands 212, 215 and between the second and third subbands 215, 217. The guard bands 221, 222 prevent or reduce out of band (OOB) interference.

As the volume of data generated by a service may change over time, for example when a new service is requested and/or when user demands of a configured services change, the component carrier may be reconfigured. In particular, a new configuration 230 is applied to fulfil demands of services at a second point in time, to ensure that Quality of Experience (QoE) and/or Quality of Service (QoS) is maintained.

In particular, the component carrier is reconfigured to use a fourth waveform 231 and numerology B, with a fourth maximum allocated transmit-power 244 in a configured subband 232 having a reduced size, for use by service P.

The component carrier is further reconfigured to use a fifth waveform 233 and numerology A, with a reconfigured maximum allocated transmit-power 245 in a reconfigured subband 234 having an expanded size, for use by service O. Similarly, the component carrier is reconfigured to use a waveform 237 and new numerology C, with a maximum allocated transmit-power 246 in a configured subband 238, for use by new service S. Finally, the component carrier is reconfigured to use a waveform 235 and numerology D, with a reconfigured maximum allocated transmit-power 247 in a reconfigured subband 236 of reduced size for use by service Q.

Adding, removing or reconfiguring a sub-band(s) on an NR component carrier may further result in guard band reconfiguration to ensure the optimum spectral utilisation. Waveforms on a component carrier reconfiguration may result in service interruption and it is desirable that a reconfiguration transition period 250 be minimal or zero, to enable a seamless transition.

According to embodiments of the present invention, a set of system information is broadcasted periodically at a predefined time interval, by a radio access node to UEs within its coverage area. The information is broadcast within a system sub-band having a minimum predefined band-specific fixed subband-width.

In particular, the radio access node is statically configured to use one waveform and numerology within its waveform/numerology candidate set for transmitting the system information. The waveform and numerology may be selected based on the frequency band use (for example VHF, UHF, SHF, EHF or THF) and/or a network node deployment scenario.

The waveform and numerology configured for system information transmission is determined at a UE during its initial frequency and time acquisition, and using band specific fixed synchronisation signals and system information, as described in further detail below.

The periodically broadcasted system information set provides the UE with the NR network radio access node's serving information including system bandwidth; system frame timing such as system frame number (SFN); number of configured operational sub-bands within the operational system bandwidth; operation sub-bands location, and waveform's numerologies configured for further in-sub-band signal reception and/or transmission.

Figure 6:
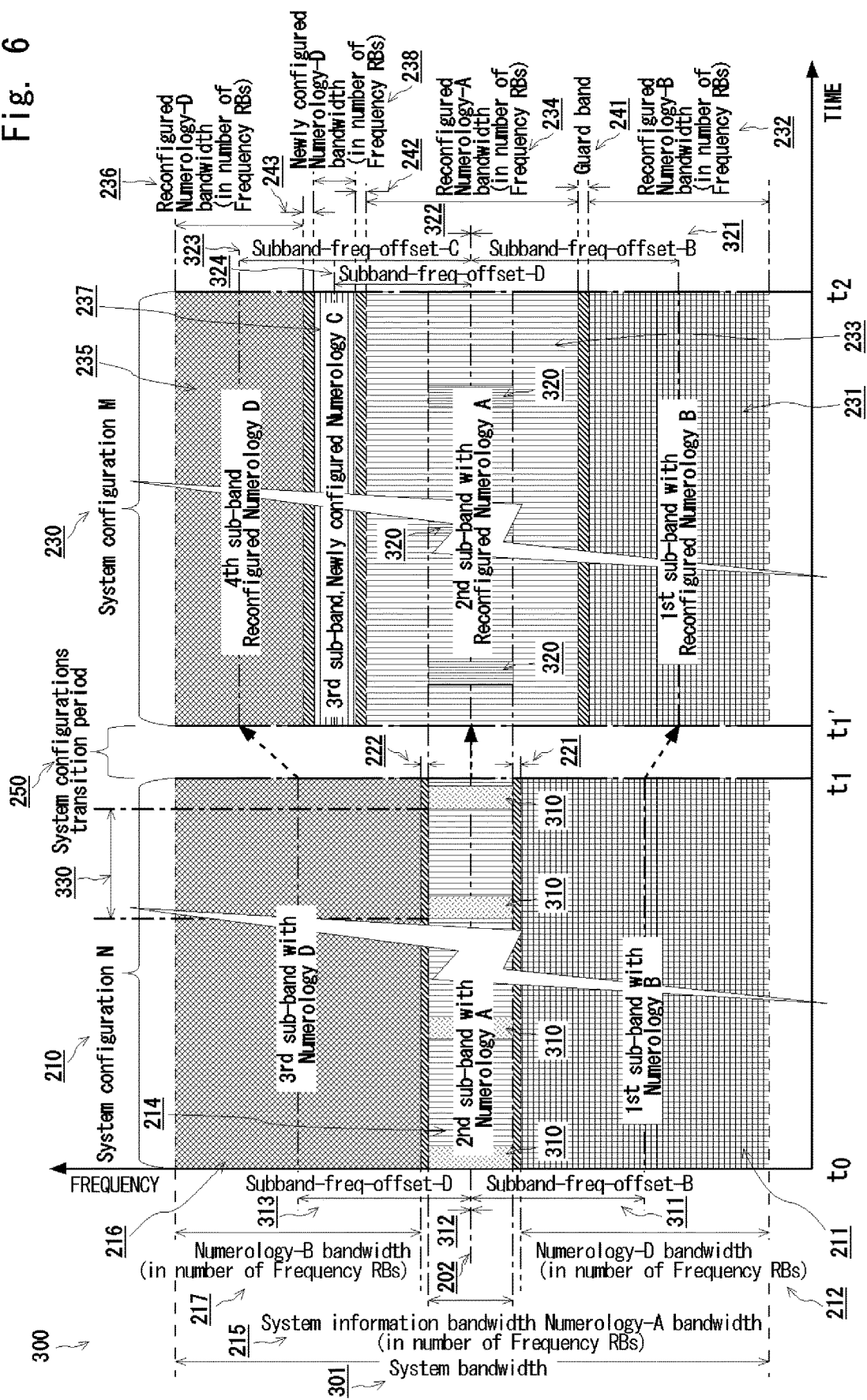
FIG. 6 illustrates a system configuration, according to an embodiment of the present invention.

FIG. 6 illustrates a system configuration 300, according to an embodiment of the present invention. The configuration enables flexible sub-band configuration, with different numerologies, and configuration and reconfiguration of same.

System information 310, 320 is broadcast by a radio access node, periodically at a predefined time interval 330, and within a predefined system bandwidth 215. The system information 310, 320 provides a system operation bandwidth 301, and configured system information elements representing an initial system configuration N 210 for the first time period (i.e. $t_0$ to $t_1$) and reconfigured system information elements representing NR system reconfiguration M 230 for the second time period (i.e. $t_1$ to $t_2$).

The initial system configuration N 210 defines three sub-bands, including a first sub-band 211 using numerology B, a second sub-band 214 in the form of a system sub-band using numerology A, and a third sub-band 216 using numerology D.

The first sub-band 211 is associated with a first sub-band frequency offset 311 and a first subband-width 212, the second sub-band 214 is associated with a second sub-band frequency offset 312 and a second subband-width 215, and the third sub-band 216 is associated with a third sub-band frequency offset 313 and a third subband-width 217.

By configuring appropriate sub-band frequency offset and subband-width values, paired adjacent sub-bands (i.e. the first subband 211 and the second subband 214, and the second subband 214 and the third subband 216) can be provided with guard-bands 221, 222 that effectively and dynamically manage OOB interference.

The second broadcast system information M 230 defines four sub-bands including a first subband 231 using numerology B, a second subband 233 in the form of a system subband using numerology A, a third subband 237 using numerology C, and a fourth subband 235 using numerology D.

The first sub-band 231 is associated with a sub-band frequency offset 321 and associated subband-width 232, the second sub-band 233 is associated with a sub-band frequency offset 322 and associated subband-width 234, the third sub-band 237 is associated with a sub-band frequency offset 324 and an associated subband-width 238, and the fourth sub-band 235 is associated with a sub-band frequency offset 323 and associated subband-width 236.

By configuring appropriate sub-band frequency offset values and associated subband-width values of adjacent paired sub-bands (i.e. the first and second sub-bands 231, 233, the second and third sub-bands 233, 237, and the third and fourth sub-bands 237, 235), guard-bands 241, 242, 243 can be provided for effectively and dynamically managing OOB interferences.

Figure 7:
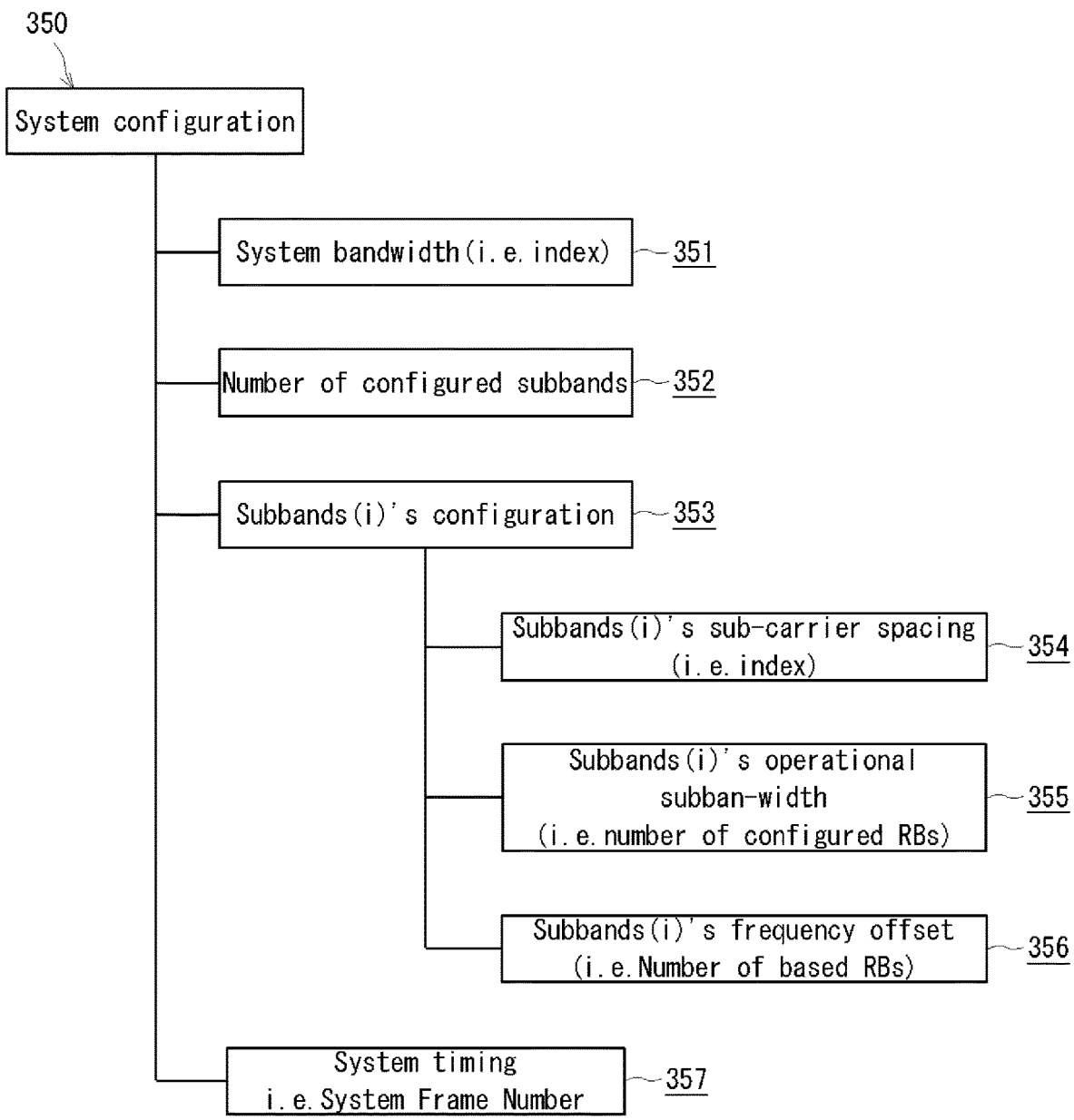
FIG. 7 schematically illustrates an information structure that enables sub-bands with different numerologies to be configured and reconfigured, according to an embodiment of the present invention.

FIG. 7 schematically illustrates an information structure 350 that enables sub-bands with different numerologies to be configured and reconfigured, according to an embodiment of the present invention. The information structure 350 is designed to be transmitted from a radio access node, within a predefined band-specific-fixed central subband-width or BW, regardless of the waveform and numerology configured for transmission and reception of the said NR system information. For the UHF band, a predefined band-specific-fixed central subband-width of 1080 KHz may be used.

The information structure 350 includes a plurality of information elements (IEs) in the form of a system bandwidth element 351, a number of configured sub-bands element 352, one or more subband configurations 353, and a system timing element 357.

The system bandwidth element 351 comprises an index identifying one of a plurality of predefined system bandwidth values, such as 1.4, 5, 10, 15, 20, 40, 80, or 100 MHz.

The number of configured sub-bands element 352 comprises an integer defining the number of configured sub-bands, and is in the range of [1: $N_{subband}^{max}$], where $N_{Subband}^{max}$ is a predefined maximum number of sub-bands that can be configured within the system bandwidth.

The subband configurations 353 include a configuration for each of the number of configured sub-bands, and each configuration includes a subband sub-carrier spacing 354, an operational subband-width 355 and a subband frequency offset 356.

The subband sub-carrier spacing 354 comprises an index identifying one of a plurality of predefined sub-carrier spacing values that are supported by the system, such as 3.75, 7.5, 15, 30 and 60 kHz.

The subband operational subband-width 355 defines a subband width as a number of resource blocks (RBs). The RBs may comprise fixed number of sub-carriers, such as 12.

The subband frequency offset 356, is a natural number that defines a number of RBs of sub-carrier spacing used for system information broadcast.

Finally, the system timing 357 defines a system frame number (SFN) for single timing framework across 3G, 4G and 5G system.

Figure 8:
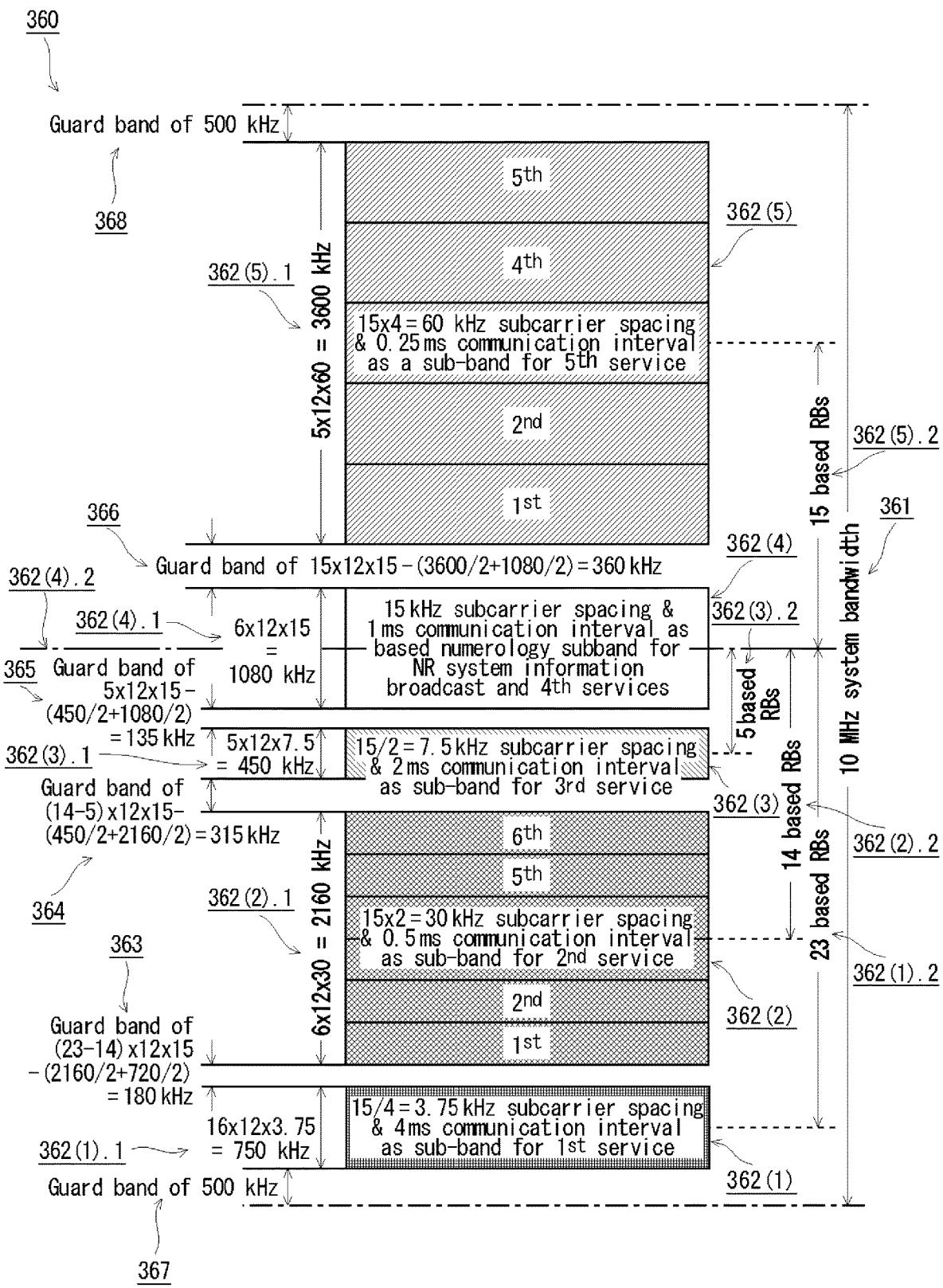
FIG. 8, which illustrates an exemplary system configuration for the UHF band, according to an embodiment of the present invention.

Usage of the system configuration 350 is exemplarily illustrated with reference to FIG. 8, which illustrates an exemplary system configuration 360 for the UHF band, according to an embodiment of the present invention. An LTE-based OFDM numerology waveform (i.e. a 15 kHz sub-carrier spacing and 1 ms communication interval or TTI or subframe) is configured for transmission and reception of NR system information.

The system configuration 360 includes five (5) sub-bands 362(1), 362(2), 362(3), 362(4), 362(5) within the system bandwidth 361, which has a value of 10 MHz.

The first subband 362(1) is configured with a sub-carrier spacing of 3.75 kHz, an operational subband-width 362(1).1 of 16 RBs, and a frequency offset 362(1).2 of −23 RBs from the carrier frequency, leaving a lower guard band 367 of 500 kHz.

The second subband 362(2) is configured with a sub-carrier spacing of 30 kHz, an operational subband-width 362(2).1 of 6 RBs, and a frequency offset 362(2).2 of −14 RBs from the carrier frequency, leaving a guard band 363 of 180 kHz between the first subband 362(1) and the second subband 362(2).

The third subband 362(3) is configured with a sub-carrier spacing of 7.5 kHz, an operational subband-width 362(3).1 of 5 RBs, and a frequency offset 362(3).2 of −5 RBs from the carrier frequency, leaving a guard band 364 of 315 kHz between the second subband 362(2) and the third subband 362(3).

The fourth subband 362(4) is configured with a sub-carrier spacing of 15 kHz an operational subband-width 362(4).1 of 6 RBs, and a frequency offset 362(4).2 of 0 based RBs from the carrier frequency (i.e. the same as the carrier frequency), leaving a guard band 365 of 135 kHz between the third subband 362(3) and the fourth subband 362(4).

Finally, the fifth subband 362(5) is configured with a sub-carrier spacing of 60 kHz and an operational subband-width 362(5).1 of 5 RBs, and a frequency offset 362(5).2 of +15 RBs from the carrier frequency, leaving a guard band 366 of 360 kHz between the fourth subband 362(4) and the fifth subband 362(5), and an upper guard band 368 of 500 kHz.

Figure 9:
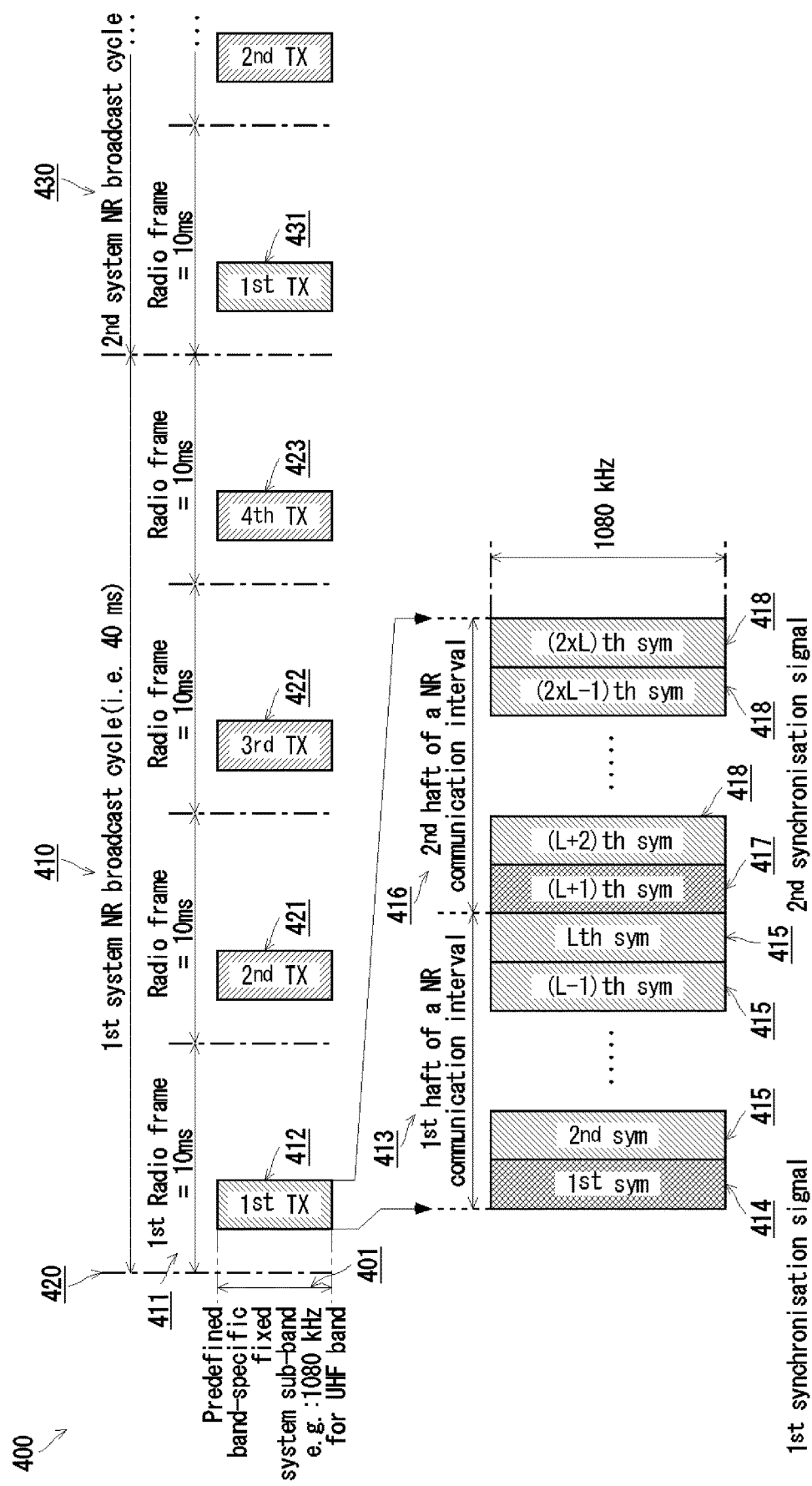
FIG. 9 illustrates an exemplary information and synchronisation signal configuration, according to an embodiment of the present invention.

Another aspect of the present invention relates to a method for use at an NR access node in transmitting system information, such as the system information 350. FIG. 9 illustrates an exemplary information and synchronisation signal configuration 400, according to an embodiment of the present invention.

System information is broadcast every broadcast cycle 410, 430, and the broadcast cycle is 40 ms long. The start of the first system broadcast cycle 410 and the start of the first 10 ms radio frame 411 in a super-frame (i.e. SFN #0) are aligned at time 420.

In order to eliminate a transition period between two consecutive system configurations, the system information 412 and system information repetitions 421, 422, 423 are broadcast in a current system broadcast cycle 410, and apply to the immediately following NR broadcast cycle 430.

Figure 10:
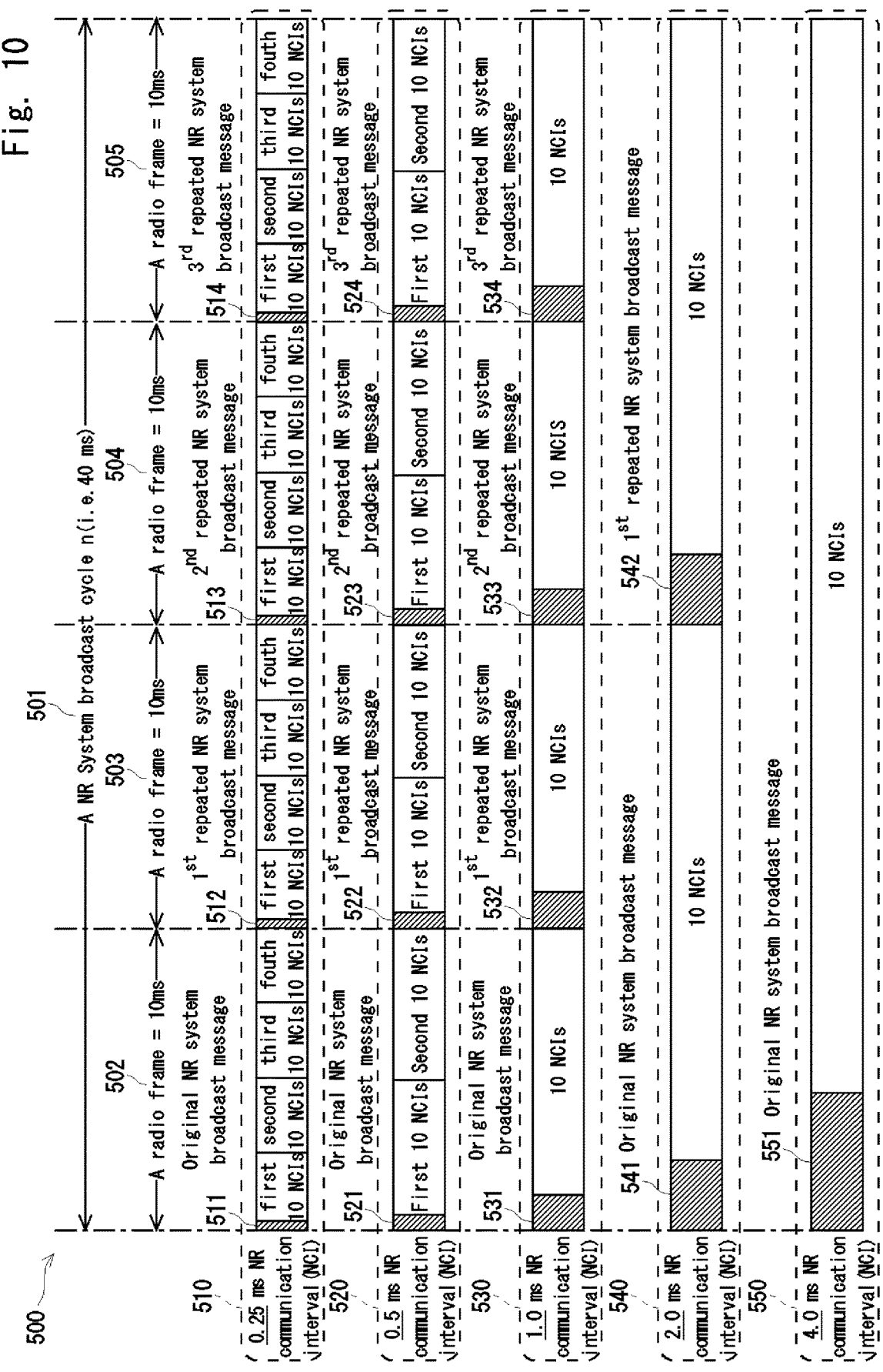
FIG. 10 illustrates an exemplary system information broadcasting configuration, according to an embodiment of the present invention.

FIG. 10 illustrates an exemplary system information broadcasting configuration 500, according to an embodiment of the present invention. The configuration is dependant on the OFDM-based numerology configured for NR signal transmission and reception.

The configuration 500 includes a system broadcast cycle 501 of 40 ms and ($10 \times 2^S$) NR communication intervals (NCIs) 510, 520, 530, 540, 550, where S={0,1,2,3,4}. Each NCI relates to a period of time that can be used for either transmission or reception of NR signals, or for concurrent transmission and reception of NR signals.

Depending on the OFDM-based numerology configured, there is at least 1 original system information transmission in a system broadcast cycle, at most four (4) system information transmissions (i.e. an original and its repetitions) per system broadcast cycle, and at most 1 system information transmission (either original or its repetition) in a 10 ms radio frame.

For example, the fifth NCI 550 is 4 ms long, and includes a single system information transmission 551 in the system broadcast cycle 501. Similarly, the fourth NCI 540 is 2 ms long and includes two system information transmissions 541, 542 in the system broadcast cycle 501.

The first, second and third NCIs 510, 520, 530 are all less than 1ms long, and include four system information transmissions 531, 532, 533 and 534, or 521, 522, 523 and 524, or 511, 512, 513 and 514 in the system broadcast cycle 501.

Furthermore, there is at most one system information transmission per radio frame (i.e. 531, 521 or 511 in 502; 532, 522 or 512 in 503; 533, 523 or 513 in 504; and 534, 524 or 514 in 505).

An NR access node can be configured to transmit system information on any NCI within a system broadcast cycle to assist inter-cell interference coordination. For example, the second NCI 520, which has a length of 0.5 ms, is configured for system broadcast, and the first NCI 510 of the first radio frame 502 of the system broadcast cycle 501, and the next three (3) radio frames 503, 504, 505 of the first NCI 510 are selected for the transmission of the repeated NR system information 512, 513, 514. Additionally, for NCIs 510, 520 that have a length of less than 1 ms, multiple NCIs within a radio frame may be selected for the mapping of system information, which may assist fast network access in mission critical communication systems.

Turning back to FIG. 9, on a NCI 412 selected for transmission of an original NR system information, or an NCI 421, 422, 423 selected for its repetitions, only sub-carriers within a predefined band-specific fixed subband-width or BW are used for the mapping of NR system information modulated & precoded symbols.

For example, on the UHF band, sub-carriers within pre-defined fixed central subband-width 401 of 1080 kHz are used for the mapping of NR system information modulated & precoded symbols.

Furthermore, an NCI selected for transmission of system information is divided into a first half NCI 413 and a second half NCI 416. A first symbol 414 in the first half NCI 413 is reserved for the first synchronisation signal, and a first symbol 417 in the second half NCI 416 is reserved for the second synchronisation signal. The remaining symbols 415 in the first half NCI 412 and the remaining symbols 418 in the second half NCI 416 are allocated for the mapping of NR system information.

Another aspect of the present invention relates to a method for use at an NR access node in transmitting synchronisation signals, for assisting UE(s) under the NR access node coverage to detect a base numerology that is configured for the transmission and reception of NR system information, and is described below with reference to FIGS. 11A, 11B, 11C, FIGS. 12A, 12B and FIGS. 13A, 13B.

The first or second synchronisation signal is a sequence of fixed length, e.g. 64 elements long, and is mapped on the sub-carriers within the central predefined band-specific fixed subband-width or BW on symbols reserved for the first or second synchronisation signal. For example, for UHF band, on the sub-carriers within the central 960 kHz, symbols that are reserved for the first or second synchronisation signal may be used.

Depending upon the base numerology used for the transmission and reception of NR system information and band-specific system deployment, a sequence of fixed length e.g. 64 elements may be a) repeated ($2^k$) times where k={0,1,2 ...} and then mapped on the symbol being reserved for the first or second synchronisation signal; or b) split into ($2^k$) sections of equal length where k={1,2, ... }.

As such, a selected section may be mapped on a selected NCI, or multiple sections may be mapped onto ($2^k$) predetermined NCIs within a radio frame. The mapping of multiple sections onto ($2^k$) predetermined NCIs within a radio frame may be considered for MCC to assist fast network access.

Figure 11A:
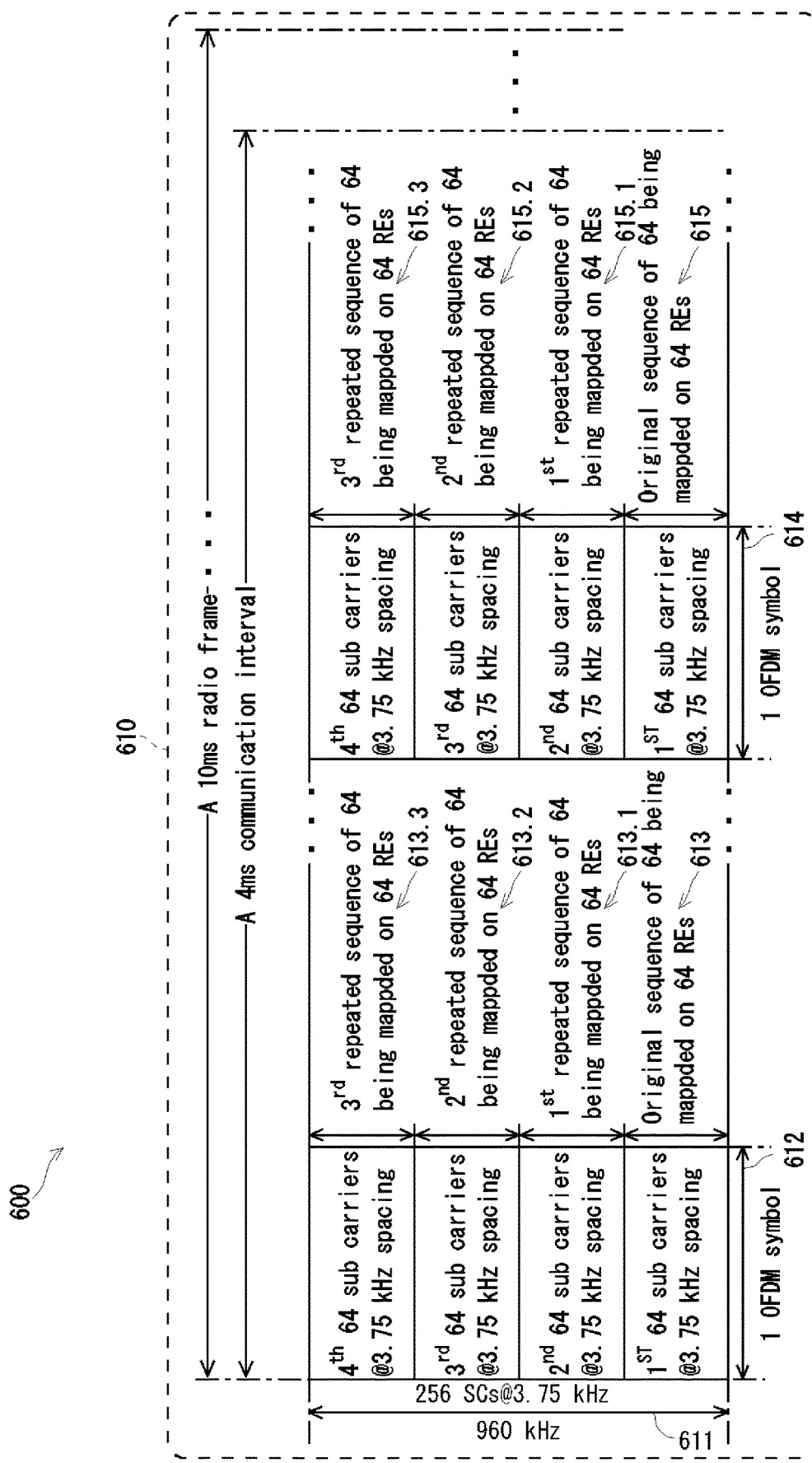
FIG. 11A illustrates an exemplary synchronisation signal transmission configuration, according to an embodiment of the present invention.
Figure 11B:
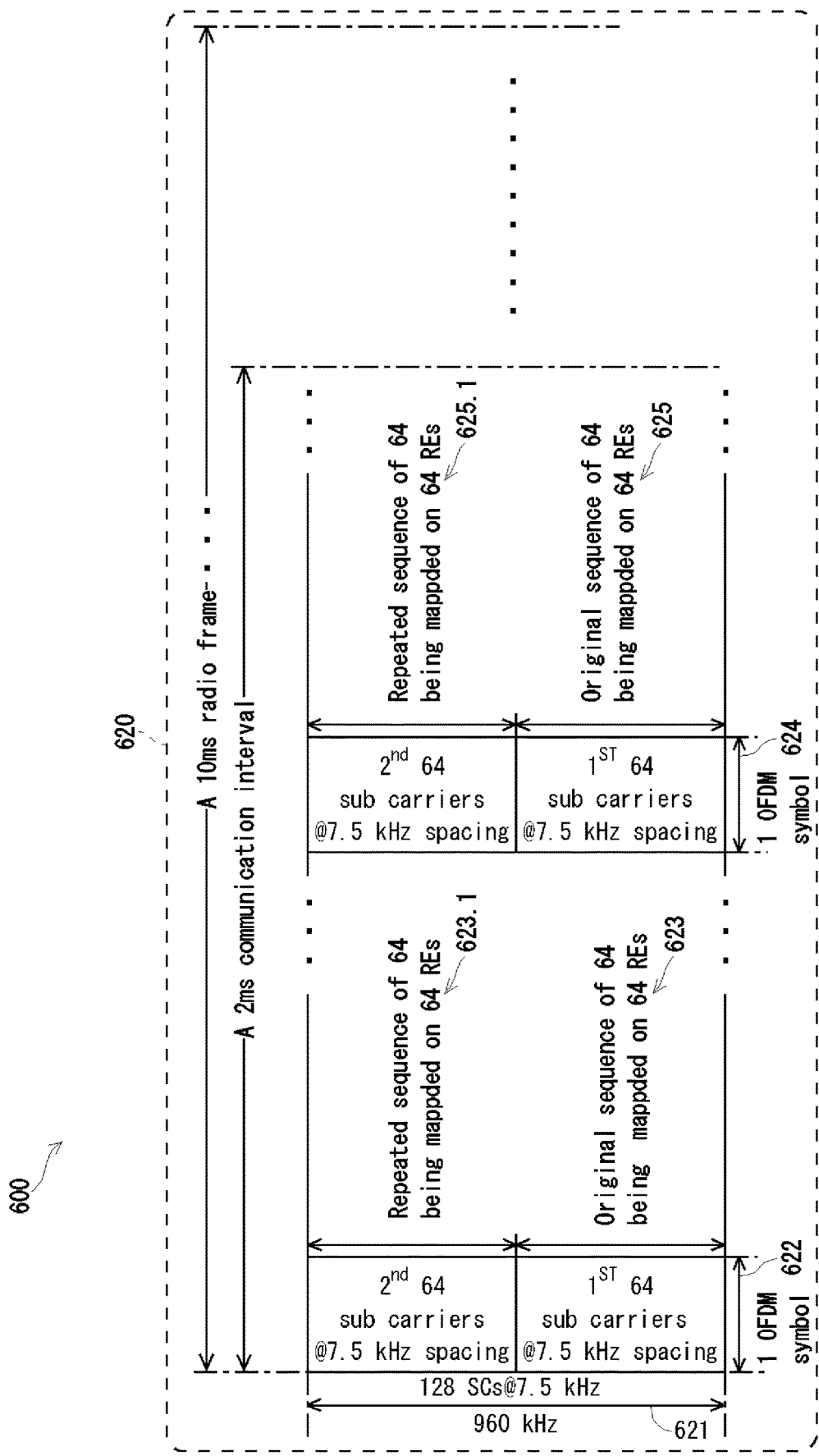
FIG. 11B illustrates an exemplary synchronisation signal transmission configuration, according to an embodiment of the present invention.
Figure 11C:
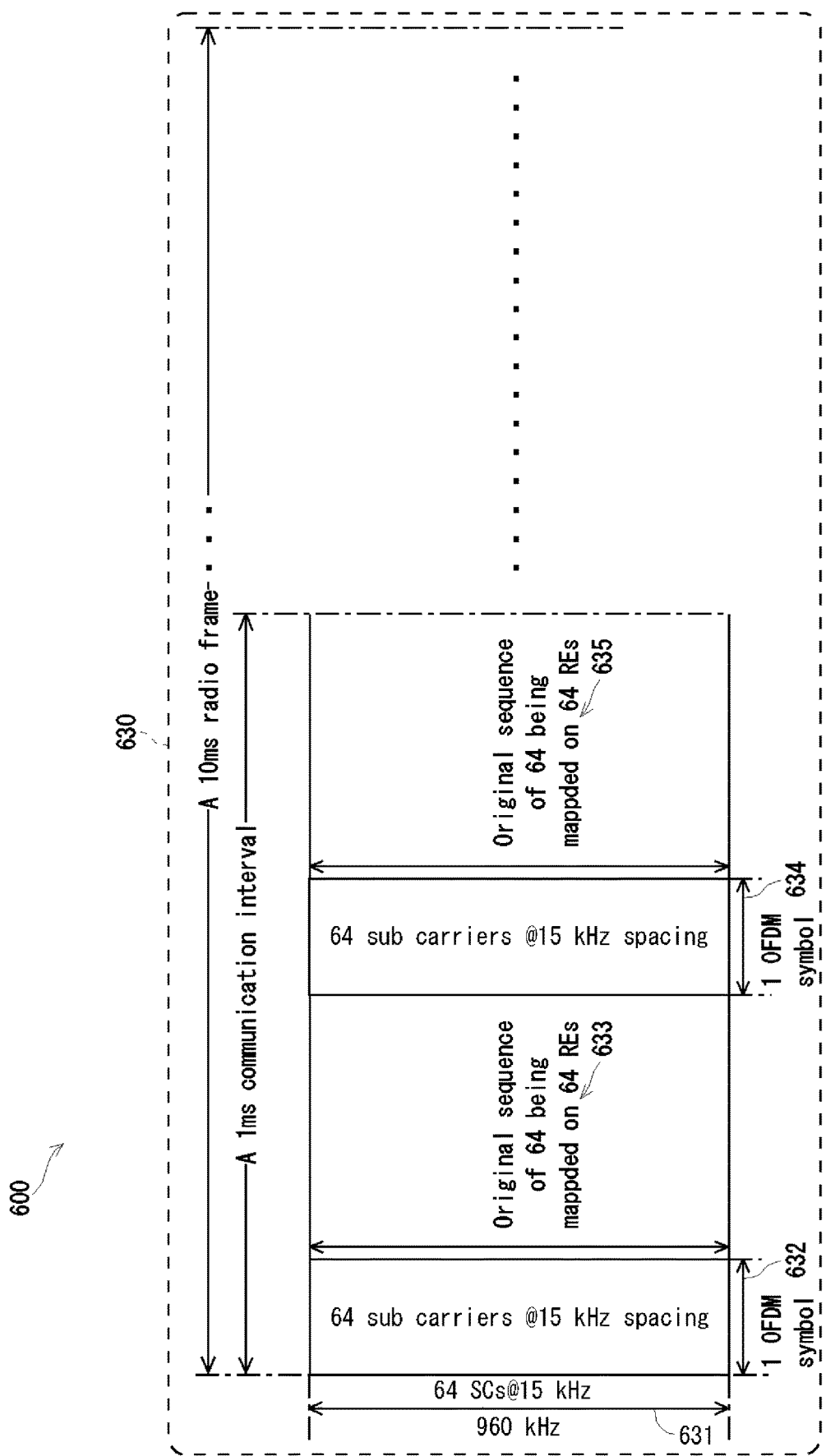
FIG. 11C illustrates an exemplary synchronisation signal transmission configuration, according to an embodiment of the present invention.

FIGS. 11A, 11B, and 11C illustrate an exemplary synchronisation signal transmission configuration 600, according to an embodiment of the present invention. The configuration relates to synchronisation signals in a single OFDM based symbol in the UHF band.

A base numerology 630 is configured with 15 kHz sub-carrier spacing and 1ms NCI, and a sequence of 64 elements 633, 635 is mapped directly onto 64 subcarriers 631 of the symbols reserved for the first synchronisation signal 632 or the second synchronisation signal 634.

Another base numerology 620 is configured with 7.5 kHz subcarrier spacing and 2 ms NCI, and sequences of 64 elements 623, 625 are repeated 623.1, 625.1 to form a new sequence of 128 elements, and is mapped onto 128 subcarriers 621 of the symbols reserved for the first synchronisation signal 622 or the second synchronisation signal 624.

Yet another base numerology 610 is configured with 3.75 kHz subcarrier spacing and 4 ms NCI, and a sequence of 64 elements 613, 615 are repeated three times 613.1, 613.2, 613.3 and 615.1, 615.2, and 615.3 to form a new sequence of 256 elements, and is mapped onto 256 subcarriers 611 of the symbols reserved for the first synchronisation signal 612 or the second synchronisation signal 614.

FIGS. 12A, 12B illustrate an exemplary synchronisation signal transmission configuration, according to an embodiment of the present invention. The configuration relates to synchronisation signals in multiple OFDM based symbols in the UHF band.

A first base numerology 640 is configured with 30 kHz subcarrier spacing and 0.5 ms NCI, and a sequence of 64 elements is split into two (2) sequences 648, 649 of length 32 elements. The first sequence 648 is mapped onto 32 subcarriers 641 of the symbols reserved for the first synchronisation signal 642 or the second synchronisation signal 643, and on a reserved NCI carrying system information within the first ten NCIs 646 of a radio frame.

The second sequence 649 is mapped onto the 32 subcarriers of the symbols reserved for the first synchronisation signal 644 or the second synchronisation signal 645, and on another reserved NCI within the second ten NCIs 647 of the same radio frame.

Another base numerology 650 is configured with 60 kHz subcarrier spacing and 0.25 ms NCI, and a sequence of 64 elements is split into four (4) sequences 665, 666, 667, 668 of length 16 elements.

The first sequence 665 is mapped onto 16 subcarriers 651 of the symbols reserved for a first synchronisation signal 652 or a second synchronisation signal 653, and on a first reserved NCI carrying system info within a first group of ten NCIs 661 of a radio frame 660.

The second sequence 666 is mapped onto the 16 subcarriers of the symbols reserved for a first synchronisation signal 654 or a second synchronisation signal 655, and on a second reserved NCI within a second group of ten NCIs 662 of the radio frame (660).

The third sequence 667 is mapped onto the 16 subcarriers of the symbols reserved for the first synchronisation signal 656 or the second synchronisation signal 657, and on a third reserved NCI within a third group of ten NCIs 663 of the radio frame 660.

Finally, the fourth sequence 668 is mapped onto the 16 subcarriers of the symbols reserved for the first synchronisation signal 658 or the second synchronisation signal 659, and on a fourth reserved NCI within the fourth group of ten NCIs 664 of the radio frame 660.

FIGS. 13A, 13B illustrate an exemplary synchronisation signal transmission configuration 670, according to an embodiment of the present invention. The configuration relates to synchronisation signals in one and multiple OFDM based symbols in the SHF or EHF bands.

A minimum band-specific fixed system sub-band 671 is predefined so that a UE may implicitly determine a band-specific subband-width within a system subband for synchronisation signal and system information acquisition. Where a predefined fixed subband-width or BW for synchronisation signal and system information mapping is sufficiently large, the entire synchronisation sequence 673, 675, which has a fixed length, e.g. 64 elements, or entire synchronisation sequence and one or more repetition(s) 673 and 673.1, or 675 and 675.1, may be mapped on subcarriers within the predefined fixed subband-width or BW of the OFDM-based symbol reserved for the first synchronisation signal 672 or the second synchronisation signal 674.

FIG. 13B illustrates an exemplary signal transmission configuration 680, where another band-specific system deployment is used. In particular, the system may be specifically configured for mission critical communication which requires URLLC, ultra-fast network synchronisation and access. In such case, a 10 ms radio frame may comprise multiple periods of 10 communication intervals 686, 687. In order to facilitate fast system information acquisition for further fast network access the synchronisation sequence of fixed length and its repetition(s) 683 and 683.1, or 685 and 685.1, as well as system information, the system may be configured for transmission on NCIs with the same index within a radio frame, such as 688.

Figure 14:
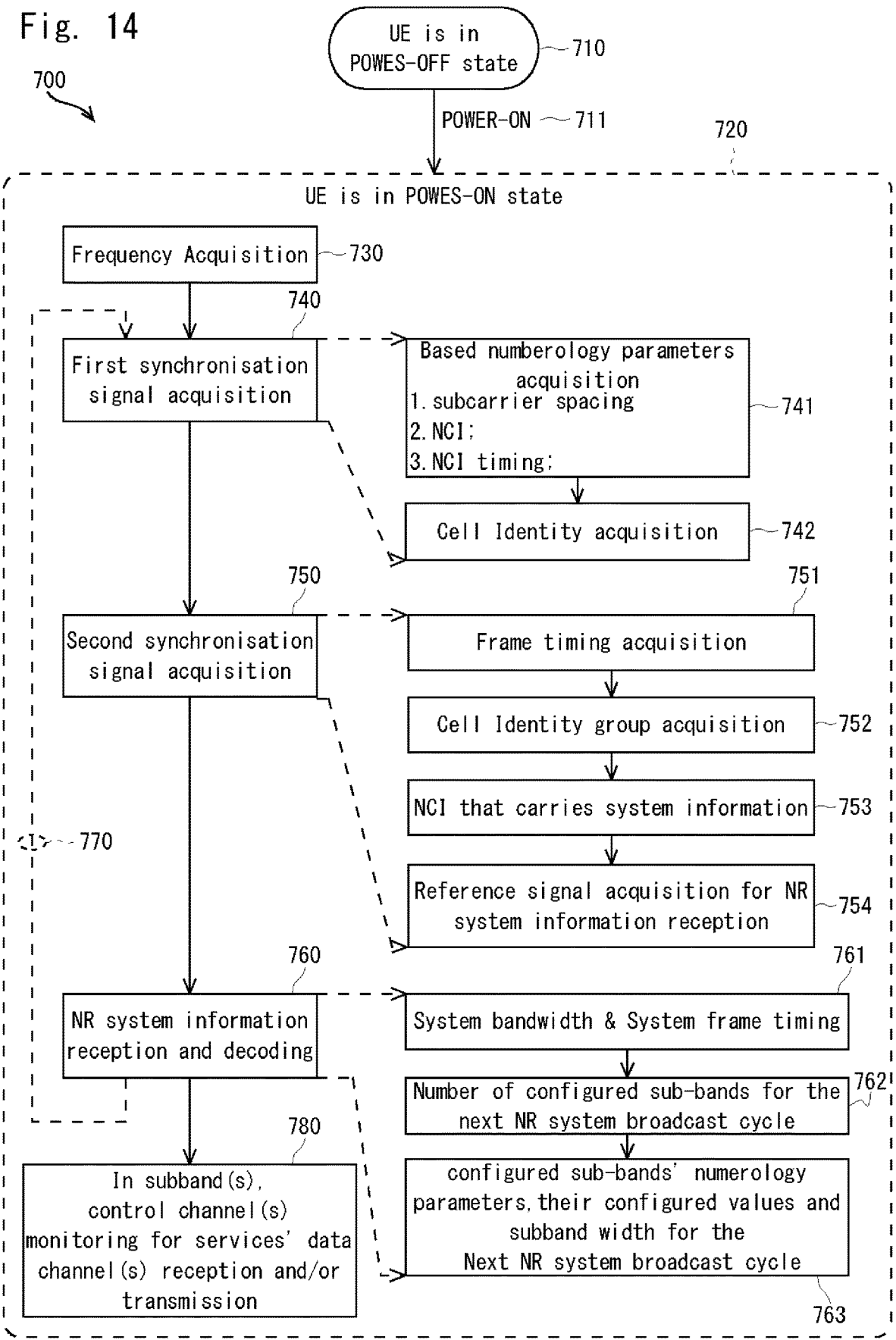
FIG. 14 illustrates a method for use at an advanced UE, according to an embodiment of the present invention.

FIG. 14 illustrates a method 700 for use at an advanced UE, according to an embodiment of the present invention.

At step 710, the UE is initially in a "POWER-OFF" state. Upon a POWER-ON 711 of the UE, the UE transitions to a "POWER-ON" state 720.

At step 730, frequency acquisition is performed, to determine available carrier frequencies for further frequency/time synchronisation and system information reception/decoding.

At step 740, first synchronisation signal acquisition is performed. In particular, the UE may use a band-specific fixed (sub)bandwidth for acquisition of synchronization signals and system information. Signal acquisition is thus performed on the predefined central (sub)bandwidth or with a non-volatile frequency offset value, where a specific way of mapping a fixed-length sequence, such as sequence of 64 elements, is used for the first synchronisation signal to assist the UE in blind detection of base numerology parameters and configured values, as illustrated in step 741; and perform cell identity acquisition, as illustrated in step 742.

At step 750, second synchronisation signal acquisition is performed. In particular, the UE may use the detected cell identity and base numerology parameters and their configured values used to further determine radio frame timing, as illustrated in step 751, cell identity group, as illustrated in step 752, and NR Communication interval (NCI) that may carry NR system information, as illustrated in step 753. Importantly, information for generating a replica of a reference signal for the reception and decoding of broadcasted NR system information is received in step 754.

At step 760, NR system information reception and decoding is performed, with the detected NCIs carrying NR system information, and information for generating the reference signal replica. In particular, the UE may further retrieve system operational bandwidth and system frame timing in step 761, determine a number of subbands that are configured for the next NR system broadcast cycle in step 762, and configure subbands numerology parameters, theirs configured values and subband-widths for the next for the next NR system broadcast cycle in step 763, as well as establish NR system information broadcast cycle.

With the detected subband configuration, an advanced-UE may in one or more subbands monitor in-subband control information for service's data channels reception and/or transmission, as illustrated in step 780.

The method further includes periodically performing first synchronisation signal acquisition 740, second synchronisation signal acquisition 750, and NR system information reception and decoding 760, as illustrated by step 770.

Advantageously, embodiments of the present invention enable mapping of synchronisation signals to waveforms, for in use for system information broadcast that assists UEs in blind detection of waveform in use. This enables adaptive selection of optimum waveform for use depending on needs.

Furthermore, methods of configuring and multiplexing subbands of different waveforms are provided, that enable implicit management of OOB interference.

Furthermore, embodiments of the present invention enable forward compatibility that allows new waveforms and/or new services to be added in the future.

The design and mapping of synchronisation signals for the waveform in use in system information broadcast enables the adaptive selection of optimum base waveform, bases on the needs/deployment of the system, by an access node.

The multiplexing of multiple waveforms of different numerologies on different portions of spectrum in a wideband radio system and associated system signalling enables the access node to implement interference management, and further assists the reconfiguration of waveforms without impact on existing UE in services and also new UE entering the cell.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australian provisional patent application No. 2016903365, filed on Aug. 24, 2016, the disclosure of which is incorporated herein in its entirety by reference.

The invention claimed is:

1. A method for use in an advanced wireless communication system, to provide adaptive radio access using a plurality of configurable orthogonal frequency division multiplex (OFDM)-based waveforms, the method comprising:
- receiving, at a user equipment (UE) and on a band-specific fixed system subband, one or more synchronisation signals;
- determining, at the UE, and according to the synchronisation signals, a base waveform numerology; and
- receiving, at the UE and according to the base waveform numerology, system information, wherein the system information defines parameters of a service or services.

2. The method of claim 1, wherein the synchronisation signals comprise a first synchronisation signal and a second synchronisation signal.

3. The method of claim 2, wherein the first synchronisation signal defines values of the base waveform numerology, and a cell identity.

4. The method of claim 2, wherein the second synchronisation signal defines a frame timing, a cell identity group, periodic based New Radio communication interval(s) (NCI(s)) carrying system information messages, and information on reference signals for the further reception and decoding of system information messages.

5. The method of claim 1, wherein the system information defines an operational bandwidth, system timing, system broadcast cycle, number of configured subbands, subband-widths, a subband multiplexing arrangement and values of the configured waveform numerologies or information elements for use in signal transmission/reception in a future broadcast cycle.

6. The method of claim 1, further comprising: monitoring one or more in-subband control channels for further in-subband data channels transmission and/or reception.

7. The method of claim 1, wherein the system information includes information elements (IEs) for configuring an OFDM-based waveform for further services in a New Radio (NR) system.

8. The method of claim 7, wherein the IEs include an NR communication interval (NCI), a subcarrier-spacing, and a subband-width.

9. The method of claim 1, wherein the system information includes a subcarrier-spacing IE in the form of an index associated with a subcarrier-spacing value in a predefined set.

10. The method of claim 9, wherein subcarrier-spacing values in the predefined set satisfy $\{(15\times 2^k)\text{ kHz}\}$ where k is an integer.

11. The method of claim 9, further comprising reconfiguring the predefined set of subcarrier-spacing values to add or remove one or more subcarrier-spacing values.

12. The method of claim 1, wherein the system information includes a subband-width IE, indicating a number consecutive resource blocks (RBs) forming a configured subband.

13. The method of claim 1, wherein different configured waveforms for signal transmission and/or reception are frequency-multiplexed, for use by multiple services simultaneously.

14. The method of claim 1, wherein waveform reconfiguration occurs at every New Radio (NR) system broadcast cycle.

15. The method of claim 1, wherein a fixed length sequence is used for the synchronisation signals.

16. The method of claim 1, wherein subband's New Radio communication intervals (NCIs) that partially or fully align with a based-NCI are reserved for downlink (DL) signal transmission.

17. The method of claim 1, further comprising: choosing, at an access node, a base waveform for transmission of the synchronisation signals and New Radio (NR) system information messages within the band-specific fixed system subband.

18. The method of claim 1, further comprising: determining an inter-cell interference coordination strategy, and choosing based New Radio communication intervals (NCIs) for transmitting the system information according to the inter-cell interference coordination strategy.

19. The method of claim 1, further comprising: periodically transmitting original system information on consecutive subcarriers of the band-specific fixed system subband, an in symbols that are not reserved for the synchronisation signals.

20. An advanced wireless communication system including:
- an advanced base station configured to provide adaptive radio access using a plurality of configurable orthogonal frequency division multiplex (OFDM)-based waveforms;
- a user equipment (UE), in communication with the based station, the UE configured to:
  - receive, from the base station and on a band-specific fixed system subband, one or more synchronisation signals;
  - determine, according to the synchronisation signals, a base waveform numerology; and
  - receive, from the base station and according to the base waveform numerology, system information, wherein the system information defines parameters for a service provided at the base station.

* * * * *

UNITED STATES PATENT AND TRADEMARK OFFICE
CERTIFICATE OF CORRECTION

PATENT NO. : 10,797,919 B2
APPLICATION NO. : 16/327612
DATED : October 6, 2020
INVENTOR(S) : Phong Nguyen and Takahiro Sasaki Page 1 of 1

It is certified that error appears in the above-identified patent and that said Letters Patent is hereby corrected as shown below:

In the Specification

Column 5, Summary of Invention, Line 4; Delete "(2"×10)" and insert --($2^n \times 10$)-- therefor Column 8, Summary of Invention, Line 10; Delete "(2"×10," and insert --($2^n \times 10$,-- therefor Column 13, Description of Embodiments, Line 39; Delete "(00B)" and insert --(OOB)-- therefor Column 17, Description of Embodiments, Line 5; Delete "lms" and insert --1ms-- therefor Column 18, Description of Embodiments, Line 11; Delete "lms" and insert --1ms-- therefor Signed and Sealed this
Twenty-second Day of December, 2020

Andrei Iancu
*Director of the United States Patent and Trademark Office*